(12) United States Patent
Abercrombie, III et al.

(10) Patent No.: US 9,325,755 B1
(45) Date of Patent: *Apr. 26, 2016

(54) SOCIAL NETWORK FOR TRAVELERS WITH LAYOVERS

(71) Applicant: INTERCEPT, LLC, Clifton, VA (US)

(72) Inventors: Charles Clinton Abercrombie, III, Clifton, VA (US); Allen D. Cassano, Broomnfield, CO (US)

(73) Assignee: INTERCEPT, LLC, Clifton, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/261,454

(22) Filed: Apr. 25, 2014

Related U.S. Application Data

(63) Continuation-in-part of application No. 13/684,649, filed on Nov. 26, 2012, now Pat. No. 8,751,509, which is a continuation of application No. 11/857,977, filed on Sep. 19, 2007, now Pat. No. 8,341,162.

(51) Int. Cl.

| | | |
|---|---|---|
| *G06F 17/30* | (2006.01) | |
| *H04L 29/06* | (2006.01) | |
| *G06Q 10/02* | (2012.01) | |
| *G06Q 10/10* | (2012.01) | |
| *H04L 12/58* | (2006.01) | |

(52) U.S. Cl.
CPC ........ *H04L 65/403* (2013.01); *G06F 17/30241* (2013.01); *G06Q 10/02* (2013.01); *G06Q 10/025* (2013.01); *G06Q 10/109* (2013.01); *H04L 12/588* (2013.01)

(58) Field of Classification Search
CPC ............. G06F 17/30241; G06Q 10/02; G06Q 30/0269
See application file for complete search history.

(56) References Cited

U.S. PATENT DOCUMENTS

| 6,711,617 | B1 * | 3/2004 | Bantz et al. ................... 709/227 |
|---|---|---|---|
| 7,069,308 | B2 | 6/2006 | Abrams |
| 7,117,254 | B2 | 10/2006 | Lunt et al. |
| 7,188,153 | B2 | 3/2007 | Lunt et al. |
| 2002/0091556 | A1 | 7/2002 | Fiala et al. |

(Continued)

FOREIGN PATENT DOCUMENTS

| KR | 10-2000-0030645 A | 6/2000 |
|---|---|---|
| KR | 10-2004-0034060 A | 4/2004 |

OTHER PUBLICATIONS

"http://www.tuctuk.com/register.php" Tuc Tuk Register, Internet Web Site, printed Sep. 23, 2008.

*Primary Examiner* — Mohammad S Rostami
(74) *Attorney, Agent, or Firm* — Larson & Larson, P.A.; Frank Liebenow; Patrick Reid

(57) ABSTRACT

A computer system that provides a social network for traveling people includes software that maintains a list of members and buddies of the members. The software downloads schedule(s) from pre-determined schedule system(s). Each schedule has records with a person identifier, at least one date/time, and a location. The software searches the schedule(s) and extracts a subset of records in which the person identifier corresponds with a member from the list of members and the software creates layover entries from the subset. The software searches the layover entries for overlapping layovers, determined by a first member having a layover that overlaps with a layover of a buddy member (e.g. having the same or similar location and time/date). For each overlapping layover, the software notifies either the member and/or the buddy who have the overlapping layover.

19 Claims, 22 Drawing Sheets

(56) References Cited

U.S. PATENT DOCUMENTS

| | | |
|---|---|---|
| 2005/0144483 A1 | 6/2005 | Robertson et al. |
| 2006/0004590 A1* | 1/2006 | Khoo .................. 705/1 |
| 2006/0041543 A1 | 2/2006 | Achlioptas |
| 2006/0042483 A1 | 3/2006 | Work et al. |
| 2006/0111959 A1* | 5/2006 | Tarr et al. .................. 705/10 |
| 2006/0150175 A1 | 7/2006 | Etelapera |
| 2006/0156242 A1 | 7/2006 | Bedingfield |
| 2007/0078729 A1 | 4/2007 | Brown |
| 2007/0273558 A1 | 11/2007 | Smith et al. |
| 2008/0016442 A1* | 1/2008 | Khoo .................. 715/700 |
| 2008/0021728 A1* | 1/2008 | Khoo .................. 705/1 |
| 2008/0082421 A1 | 4/2008 | Onyon et al. |
| 2008/0091445 A1* | 4/2008 | Mihic .................. 705/1 |
| 2008/0098313 A1 | 4/2008 | Pollack |
| 2008/0132252 A1 | 6/2008 | Altman et al. |
| 2008/0140786 A1 | 6/2008 | Tran |
| 2008/0195664 A1 | 8/2008 | Maharajh et al. |
| 2008/0228719 A1 | 9/2008 | Abhyanker et al. |
| 2008/0235331 A1 | 9/2008 | Melamed et al. |
| 2008/0243564 A1* | 10/2008 | Busch et al. .................. 705/6 |
| 2008/0301207 A1* | 12/2008 | Demarest et al. .............. 707/206 |
| 2009/0019004 A1 | 1/2009 | Abhyanker |

\* cited by examiner

| PILOT | 1-JULY | 2-JULY | 3-JULY |
|---|---|---|---|
| DAVID | 7A TPA→MEM 9A | 7A SFO→JFK 2P | 6A ATL→JFK 8A |
| | 1215P MEM→SFO 3P | 4P JFK→ATL 6P | 9A JFK→CIN 1030A |
| | | | 1230P CIN→LAX |
| NEIL | 6A MIA→JFK 9A | 7A SFO→JFK 3P | 545A FLL→EWR 8A |
| | 11A JFK→SFO 1P | 5P JFK→FLL 7:30P | 10A EWR→DFW 1P |
| | | | 3P DRW→MIA |
| GRAHAM | 6A JFK→IAD 730A | 10A OAK→ORD 3P | 6A ATL→CIN 8A |
| | 9A IAD→DFW 12P | 5P ORD→ATL 8P | 10A CIN→DFW 1P |
| | 2P DFW→OAK 4P | | 3P DFW→MIA |
| STEVE | 5A LAX→JFK 1P | 630A FLL→JFK 930A | 530A LAX→JFK 2P |
| | 3P JFK→CLE 5P | 2P JFK→LAX 4P | 430P JFK→MIA |
| | 7P CLE→FLL 1030P | | |

*FIG. 12*

| PILOT | 1-JULY | 2-JULY | 3-JULY |
|---|---|---|---|
| DAVID | SFO | ATL | LAX |
| NEIL | SFO | FLL | MIA |
| GRAHAM | OAK | ATL | MIA |
| STEVE | FLL | LAX | MIA |

*FIG. 13*

| AIRPORT CODE/PLACE | LOCATION | COORDINATES |
|---|---|---|
| SFO | SF BAY AREA | 37.6189° N, 122.3750° W |
| OAK | SF BAY AREA | 37.7214° N, 122.2208° W |
| SJC | SF BAY AREA | 37.3628° N, 121.9292° W |
| LAX | LOS ANGELES AREA | 33.9425° N, 118.4081° W |
| SNA | LOS ANGELES AREA | 33.6756° N, 117.8683° W |
| JFK | NYC AREA | 40.6397° N, 73.7789° W |
| LGA | NYC AREA | 40.7772° N, 73.8726° W |
| EWR | NYC AREA | 40.6925° N, 74.1686° W |
| My Place Hotel | 5th Street, San Francisco, CA | 37.7833° N, 122.4167° W |
| Happy Hotel | Airport Hotel, San Jose, CA | 37.3625° N, 121.9292° W |

FIRST NAME:
LAST NAME:
EMAIL ADDRESS:
REPEAT EMAIL ADDR:
PASSWORD:
REPEAT PASSWORD:
PHONE NUMBER:
CELL PHONE NUM:
PAGER NUMBER:
ADDRESS:
ASSOCIATIONS
PREFERRED CONTACT:
○ PHONE
○ CELL
○ PAGE
○ EMAIL

| Subject: | Invitation to Join <Social Network> from David Doe |
|---|---|
| From: | David_doe@domainname.com |
| To: | ◄ ► |

David Doe has invited you to join David's private community of pilots and flight attendants in which you and David can network and determine when you will have a layover in an overlapping city.

You can use this network to keep in touch with old friends, meet new friends, determine when one of your friends will be in a visiting city and, schedule time to meet with your friend(s) in that city.

Click the link below to join the pilot/flight-attendant network:
http://www/p-fa.com/join/invite-12345 —312

SOCIAL NETWORK FOR TRAVELERS WITH LAYOVERS

CROSS-REFERENCE TO RELATED APPLICATION

This application is a continuation-in-part of U.S. patent application Ser. No. 13/684,649 filed Nov. 26, 2012, which in turn is a continuation of U.S. Pat. No. 8,341,162 issued Dec. 25, 2012, the disclosure of both are hereby incorporated by reference.

FIELD

This invention relates to the field of data processing and more particularly to a system for managing and notifying regarding layovers for travelers.

BACKGROUND

Social networks are well known. Early in the history of the Internet, social networks primarily provided a dating service whereby a user would register and create a profile containing a posting. In this, they would describe themselves, their likes, dislikes, hobbies, work, etc. Once created, the posting is advertised to others looking for a partner.

Later, such networks evolved to concentrate on needs other than dating. Web sites the likes of Myspace.com and Facebook.com appeal to the social needs of people, providing a canvas on which members write about themselves, post pictures and the like.

For the more business focus, web sites such as Linkedin.com emerged to provide online business networking. Such a network provides secure access and a system that mimics business relationship networking. For example, once you are invited to become a friend (or buddy) to another member and accept, you have the ability to keep in contact with that member, plus, if friends of your friend allows, you will be able to network with that person too.

Several patents and patent publications describe social networks or specialized features of certain social networks. U.S. Pat. No. 7,188,153 to Lunt, et al., describes a social network that includes a feature to upload files such as images (picture) that can be viewed by your contacts.

U.S. Pat. No. 7,069,308 to Abrams describes a method of more effectively connecting people in a social network.

U.S. Pat. No. 7,117,254 to Lunt, et al., describes a social network that includes an invitation feature for members to invite new members to join their private network and for members to write positive comments about other members.

U.S. Pat. Application No. 2006/0042483 to Work, et al., describes a method for evaluating reputations of users in a social network.

U.S. Pat. Application No. 2006/0041543 to Achlioptas describes a method for navigating and searching in a social network.

What is needed is a system that will provide the usual social networking tools with the addition of providing tools for finding out when a user is on a layover, trip, or vacation in the same location as another user.

SUMMARY

In one embodiment, a computer system providing a social network for traveling people is disclosed including a server computer and software. The software maintains a list of members and, for each member; the software maintains a list of buddies of the each member. The buddies are also in the list of members. Each member has at least one association to a unique person identifier (e.g. an email account, user name, user identifier, etc.). The software downloads at least one schedule from one or more pre-determined schedule systems. Each schedule has a plurality of records, each having a person identifier, at least one date/time, and a location. The person identifier uniquely identifies each person associated with each record. The software searches the schedule(s) and extracts a subset of records (or entire set of records) in which the person identifier corresponds with a member of the list of members and the software creates layover entries from the subset of the records, each of the layover entries comprise the member, a layover location and a layover date/time and optionally an event code. The software searches the layover entries for overlapping layovers, determined by a first member of the list of members having a layover that overlaps with a layover of a buddy member (e.g. having the same or similar location). For each overlapping layover, the software notifies either the member and/or the buddy who have the overlapping layover at predetermined time (e.g. now or at a time such as 48 hours prior to the date of the overlap).

In another embodiment, a method of notifying members of a social network of upcoming overlapping layovers is disclosed including (a) maintaining a list of members and, for each member, maintaining a list of buddies of the each member. Each member has at least one association to at least one unique identifier. Next, (b) downloading at least one schedule from at least one pre-determined schedule system. Each of the at least one schedule has been created by one of the at least one schedule system. Each record of the at least one schedule has a person identifier, a date, and a location, wherein the person identifiers identifies one person (often a person is known by a different identifier on different systems such as user123, user@domain.com, etc.). (c) For each record, if the person identifier matches the unique identifier of a member, a layover data record is saved that includes the member, the date, and the location. (d) For each of the layover data records, the layover data records are searched for a buddy having an overlapping layover data record, and if the searching finds an overlapping layover data record, the member(s) of the overlapping layover is/are automatically notified at a predetermined time (e.g. now or at a time such as 48 hours prior to the date of the overlap).

In another embodiment, a signal tangibly embodied in a non-transitory storage medium for notifying of upcoming overlapping layovers is disclosed includes: (a) computer readable instructions that maintain a list of members and, for each member, maintain a list of buddies of the each member. Each member has at least one association to at least one unique identifier (e.g. a unique email address or user name). (b) Computer readable instructions download at least one schedule. Each schedule was created on a pre-determined schedule system without direct input from the members and each schedule includes a plurality of records. Each record has a person identifier, at least one date, and at least one location. (c) Computer readable instructions extract layover data from the records in which the person identifier in the record corresponds with the unique identifier of any member of the list of members. The layover data comprises the any member (e.g. an identification of the member), a layover location, and a layover time period. The person identifier assists in uniquely identifying a correspondence between the records in the schedules and the any member of the list of members being that people tend to have different names or login credentials on different systems. (d) Computer readable instructions search the layover data for a set of overlapping layovers in which a layover of the member and a layover of a buddy of the member have the same location and (e) for each overlapping layover in the set of overlapping layovers, computer readable instructions notify the member and/or the buddy of the overlapping layover at a predetermined time (e.g. now or at a time such as 48 hours prior to the date of the overlap). (f) Periodically steps (b) through (e) are repeated.

BRIEF DESCRIPTION OF THE DRAWINGS

The invention can be best understood by those having ordinary skill in the art by reference to the following detailed description when considered in conjunction with the accompanying drawings in which:

FIG. 12 illustrates a table showing an exemplary schedule of the system for travelers with layovers.

FIG. 13 illustrates an exemplary table showing layovers of the exemplary schedule from FIG. 12 of the system for travelers with layovers.

FIG. 14 illustrates an exemplary table showing an exemplary location thesaurus of the system for travelers with layovers.

FIG. 16 illustrates a typical user interface for creating a member account of the system for travelers with layovers.

FIG. 17 illustrates a typical user interface for inviting a member to be a buddy (friend) of the system for travelers with layovers.

DETAILED DESCRIPTION

Figure 1:
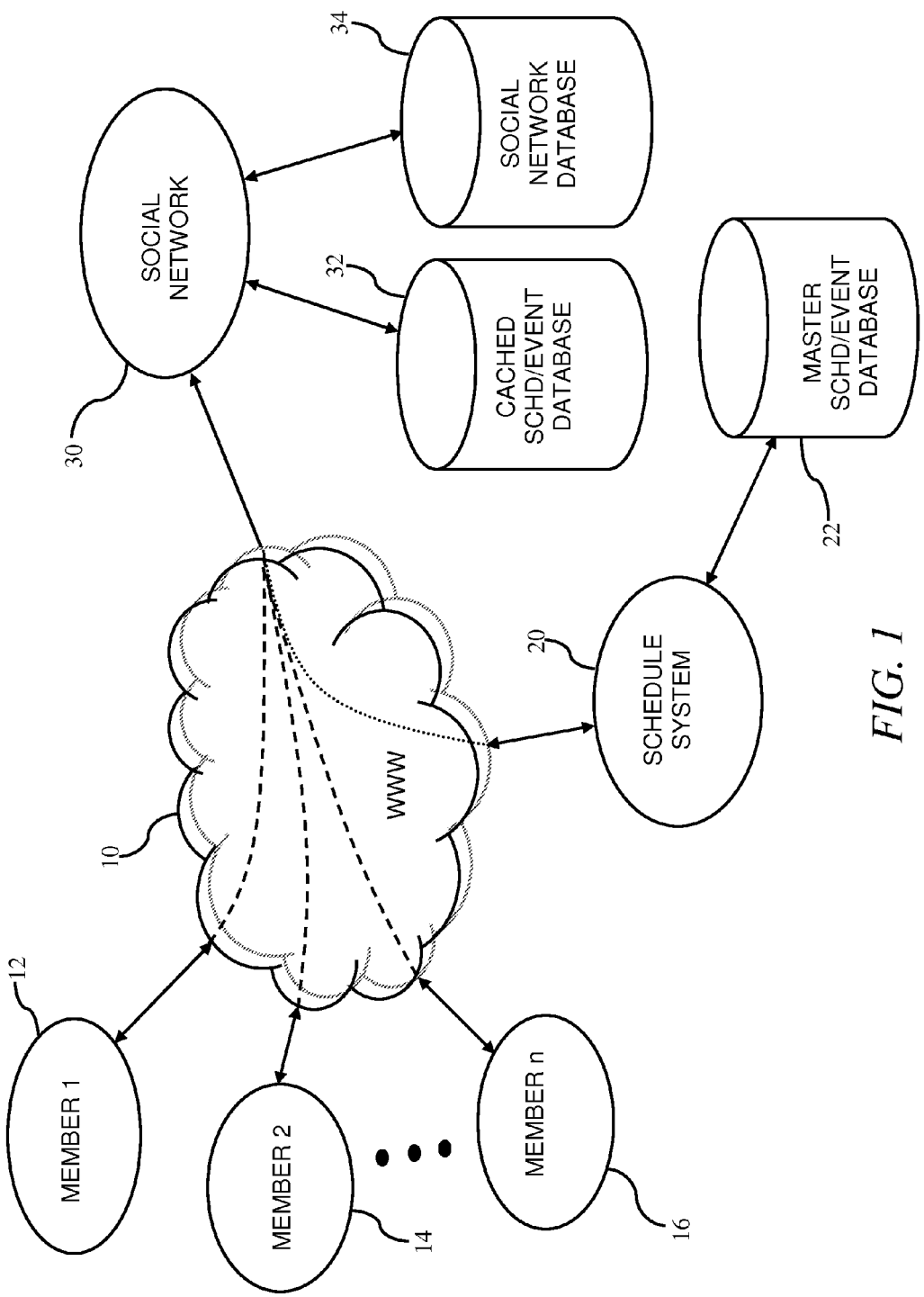
FIG. 1 illustrates an exemplary schematic view of a system for travelers with layovers.

Reference will now be made in detail to the invention, examples of which are illustrated in the accompanying drawings. Throughout the following detailed description, the same reference numerals refer to the same elements in all figures.

The term location for the purpose of the system for travelers with layovers relates to a place that is convenient for two or more members of the social network to meet during a layover, visit, trip, etc. Since the two or members are typically friends or co-workers, these members are likely aware of each other's primary location such as where they live, so when a friend or co-worker is in visiting your town/location, they will likely know that you live there and attempt to contact you (or not) as time permits. On the other hand, if you are traveling to another location and that friend or co-worker is also traveling to that same location at the same or an overlapping time period, it was not always so easy to know that you would both be in the same location. For example, if one member has a layover in Oakland and another in San Francisco, the location is the greater bay area since such would allow for both members to easily meet, perhaps using BART to travel to an agreed upon location in San Francisco. The term layover is used to describe a city/location in which the member is located for an amount of time, typically a location that is not the home of the member. Pilots, flight attendants and truck drivers often have layovers in the course of their employment. For example, a pilot scheduled to fly from Tampa arriving in San Francisco at 5:00 PM and leaving the next morning has an overnight layover.

The system for travelers with layovers is not limited in any way to pilots, flight attendants and truck drivers. Any user of the social network is capable of having a layover in a certain geographic region. For example, two members of the social network work for different companies. In the course of their work, both of these members need to be in Taipei. The time they are in Taipei is considered a layover for the purpose of the disclosed system. Therefore, if the two member's layovers in Taipei overlap, the system for travelers with layovers will inform one or both members of such overlap and, with this notification, the members can arrange to meet socially. In this example, it is also anticipated that the notification be made to the member(s) through the social network when the member(s) access the social network.

Throughout this description, when two members have a corresponding overlap or layover, a notification is sent to one or both of the members. There are many ways known in the industry to send such a notification including, but not limited to, mail (post), email, text message and page. The recipient has also many different ways to receive such notification on a plethora of devices including, but not limited to, mail boxes, personal computers, personal digital assistants (PDAs), cell phones, smart phones, pagers and PDA-cell phones (e.g., Blackberry®), tablet computers, etc.

Throughout this description, the term "member" refers to a registered user of the social network system of the system for travelers with layovers. The term "buddy" is another member of this social network system and is a person who is known to the member and has been indicated by the member to the social network as such. The term "layover" refers to a place where the member and/or buddy are located for a period of time (e.g., one or both have a layover in San Francisco for the first three days in May). It should be noted that if the member or buddy are at home, in some situations, this is a layover, though for the most part, it is anticipated that both members know where each other live. Throughout this description, the term "overlapping layover" refers to two or more members having a layover in the same location with a certain overlap in stays. For example, overlapping layovers exist when the member is visiting San Francisco for a first period of time and their buddy is also in San Francisco for a second period of time in which a minimum amount of time is common between the first period of time and the second period of time (e.g. at least one second, one minute, one hour, eight hours, one day, etc.).

The system for travelers with layovers has many benefits. For example, the system for travelers with layovers provides information to travelers to optimize their free time when on layovers, improving employee morale. Airlines use of the system for travelers with layovers provides improved employee morale and, in some circumstances, is used to determine when compatible flight crews/flight attendants are on common layovers.

Referring to FIG. 1, a schematic view of a system for travelers with layovers is shown. In this embodiment, a schedule system 20 is external to the social network 30. A schedule system 20 is, for example, an airline personnel schedule system that assigns pilots and flight attendants to specific flight schedules. Another example of a schedule system 20 is a trucking company schedule system that assigns truckers to specific routes. Another example of a schedule system 20 is a reservation system such as an airline reservation system or general reservation system such as Expedia and Orbitz. Another example of a schedule system 20 is an itinerary organizing system such as a system that manages certain events like trade shows, conferences, sporting events, etc. In the itinerary organizing system, it is anticipated that, in some embodiments, the itinerary organizing system provides a unique event code for each event being organized. The schedule system 20 is any system that includes a scheduling capability whereby that system creates the schedule entry either through manual input, a specific event date, data from the end user (e.g., a member), etc. In some embodiments, the schedule system 20 has a set of pre-determined events, trips, concerts, meetings, etc., and the user of the schedule system 20 selects, purchases, or joins one such event. For example in which the schedule system 20 is a ticketing system for events, a user of the schedule system 20 selects an event, for example purchases tickets to a football game, and the scheduling system 20 creates a schedule/event indicating that the user will be in the location of that event on the date and time of the event. In another example, an airline has specific flights, typically having a flight number. For example, airline X has a flight 240 the leaves Atlanta at 4:00 PM and arrives in Rome at 8:00 AM. In such, when a user purchases a ticket in their name for flight 240, such is considered an event and the scheduling system 20 creates an event, knowing the date that the user departs from Atlanta.

In some embodiments, each event is given a unique code. In the above example of a football game, the unique code is, for example, a sequence of characters (e.g. numbers and letters) that uniquely identifies that particular football game. One exemplary implementation would be to use a 14 digit code, in which the first four characters indicate the type of code (e.g. "FTBL" for football), the next two characters represent the location (e.g. "TB" for Tampa Bay), and the next eight characters indicate the date of the event (e.g. "12052014" for Dec. 5, 2014). Likewise, in the above example of a flight, the unique code is, for example, a sequence of characters (e.g. numbers and letters) that uniquely identifies that particular flight. One exemplary implementation would be to use a 16 digit code, in which the first four characters indicate the airline (e.g. "DL00" for Delta), the next four characters represent the flight number (e.g. "0240" for flight 240), and the next eight characters indicate the date of the event (e.g. "12052014" for Dec. 5, 2014).

By including such event codes with or without the user's schedule information, the system for travelers with layovers provides additional abilities for the members to distinguish between other members that will be in the same locale, or be traveling between the same two cities as different from other members who will be at the same event or on the same flight. For example, two members are traveling to Tampa, one visiting family and one going to a football game. One does not have a unique code and the other has the unique code of "FTBLTB12052014." Since these codes do not match, the member going to the football game knows that the other member will not be at that game. In a similar example, example, two members traveling from Atlanta to Rome on the same date, one has the unique code of "DL00024012052014" and the other has the unique code of "AIT0007712052014." Since these codes do not match, the two members are known to be on different airlines.

In the above examples, if a member only wants to be notified if they share the same event, the member, through administrative tools, informs the system of such and will only receive notification if the overlap includes an event, such as both are flying on the same flight or both are attending the same football game. In such, the members have a tool to find other members (buddies/friends) who will be at the same event so that the members are able to share a ride (saving energy and cost), meet before/after the event, change seats to sit near each other. Likewise, if a member only wants to be notified if they have an overlap but do not share the same event, the member, through administrative tools, informs the system of such and will only receive notification if they have an overlapping itinerary but do not share the event, such as both are in Tampa, but the buddy is not attending the same football game. In such, the members have a tool to find other members (buddies/friends) who will be in the same location but not at the event, and the member then has time to ask that/those buddy/buddies to join in the event (e.g. if it is a fund raiser, etc.).

In general, the user (member and/or buddy) do not directly enter schedule data into the schedule system 20, rather the user is scheduled by the schedule system and/or choose certain already available options on the schedule system which will determine when the user (member or buddy) will travel (e.g., the user selects a flight that has a pre-determined schedule). The schedule system 20 has access to a master schedule/event database 22 where the scheduling and/or event data is stored. In this embodiment, part or all of the schedule/event data from the master schedule/event database 22 is uploaded to the social network 30 through a network such as the Internet (WWW) 10. The social network 30 extracts the data needed to perform layover matching and stores at least that data in a cached schedule/event database 32. In some embodiment, the uploaded schedule/event data is processed as it is received and not stored in the cached schedule database 32. As with many social network systems, the social network 30 has its own social network database 34 for storing security information, member information, etc. In this embodiment, several members 12/14/16 are shown connected to the social network 30 through the network 10. As an example, the members 12/14/16 are pilots, flight attendants or truckers.

Figure 1A:
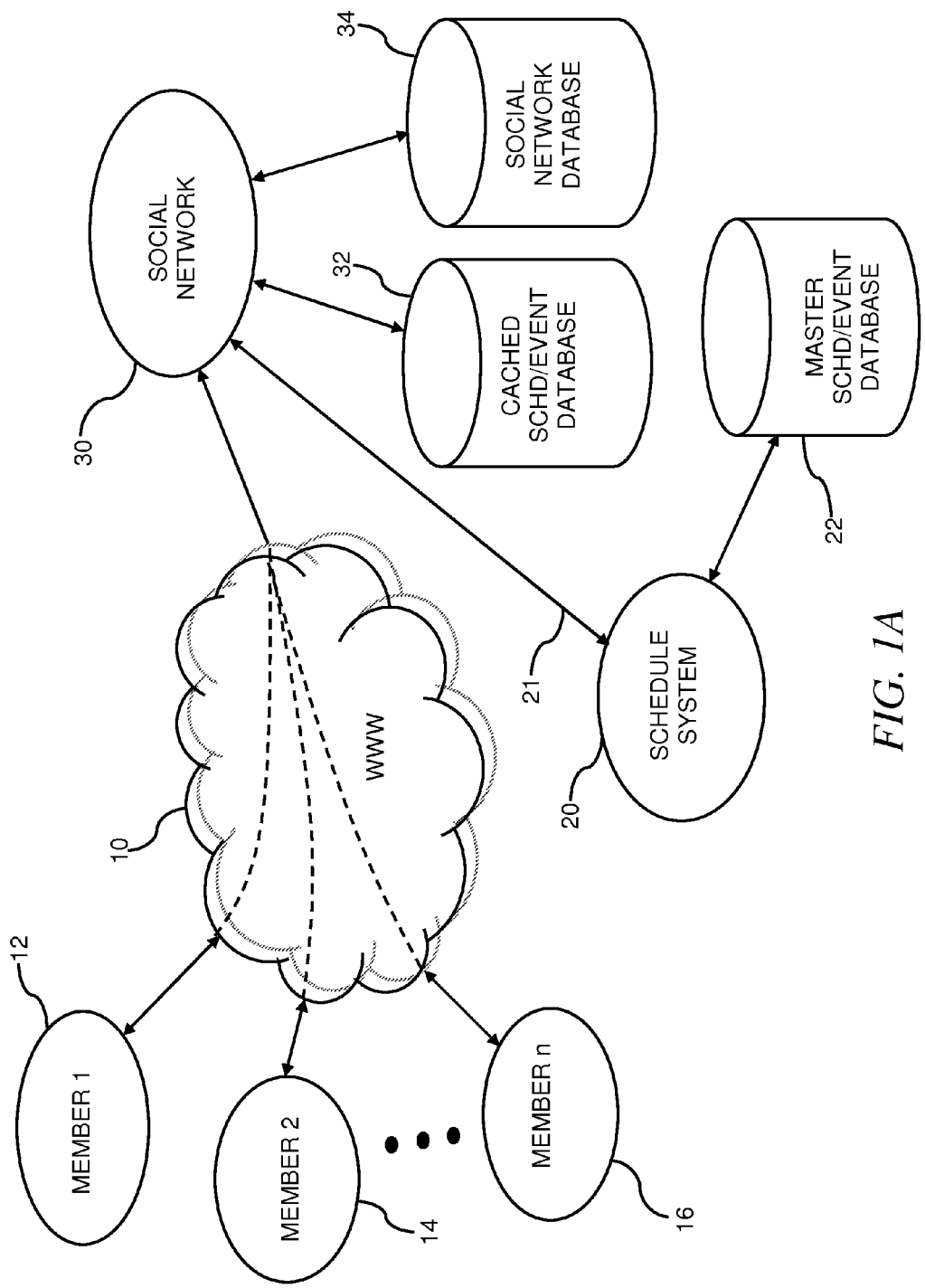
FIG. 1A illustrates a second exemplary schematic view of the system for travelers with layovers.

Referring to FIG. 1A, another schematic view of the system for travelers with layovers is shown. In this embodiment, as with that of FIG. 1, a schedule system 20 is external to the social network 30. A schedule system 20 is, for example, an airline personnel schedule system that assigns pilots and flight attendants to specific flight schedules. Another example of a schedule system 20 is a trucking company schedule system that assigns truckers to specific routes. In alternate embodiments, the schedule system 20 is any system that includes a scheduling capability as described above. The schedule system 20 has access to a master schedule/event database 22 where the scheduling and/or event data is stored. In this embodiment, part or all of the schedule/event data from the master schedule/event database 22 is uploaded to the social network 30 through a direct link 21 such as a digital transmission line (e.g., T1, T3), magnetic tape, disk, etc. This embodiment adds additional security to the sensitive schedule/event data that is being transferred. The social network 30 extracts the data needed to perform layover matching and stores at least that data in a cached schedule/event database 32. In some embodiment, the uploaded schedule/event data is processed as it is received and not stored in the cached schedule database 32. As with many social network systems, the social network 30 has its own social network database 34 for storing security information, member information, etc. In this embodiment, several members 12/14/16 are connected to the social network 30 through the network 10. As an example, the members are pilots, flight attendants or truckers. In practice, members are registered; in that, each member 12/14/16 provides personal information to the social network 30 such as name, phone number and a username/password. The user name is used to authenticate the member 12/14/16 each time the member 12/14/16 accesses the social network 30. Any number of members 12/14/16 are possible.

It is anticipated that, for some members 12/14/16, the member's name lacks sufficient uniqueness as to properly identify that member 12/14/16 across multiple systems (e.g., there are multiple flight attendants with the same first and last names). To overcome ambiguity, it is anticipated that the social network 30 provides one or more user registrations, in which, each member 12/14/16 provides further identification for each schedule system 20 of which they are a part. For example, Tina Jones is a member of the social network 30 and is known as Tina34. Tina is a pilot for United Airlines and her identification number is 123456. Tina Jones also uses Expedia and her identification for Expedia is her email address, tina@yahoo.com. The social network 30 provides tool for each member 12/14/16 to create associations between the member's account on the social network 30 and schedule systems 20, and these associations are stored, for example, in the social network database 34. These associations identify the schedule system 20 (e.g. United Airlines) and the member 12/14/16 within that schedule system 20 (e.g. badge number 123456) so that, as the schedule data is processed by the social network system 30, finding schedule records for a person with badge number 123456 will correlate to social network member Tina34, etc.

Likewise, it is anticipated that as periodic schedule downloads occur, some or all of the schedule data is repetitive. For example, if Tina Jones is scheduled to fly from Detroit to Amsterdam at 3:30 PM on August 21, arriving at 7:00 AM on August 22, then each day before August 21, this information is present in the data that is transferred from the schedule system 20 to the social network system 30. If Tina Jones is a buddy to Mike Smith, and Mike Smith will also have a layover in Amsterdam on August 22, then the first time that this schedule data is downloaded from the schedule system 20 to the social network 30, Tina and/or Mike are notified of the overlap. Alternatively, in some embodiments, Tina and/or Mike are notified at one or more a predetermined intervals before the overlap. For example, Tina and/or Mike are notified 10 days before the overlap. In another example, Tina and/or Mike are notified at 10 days before the overlap and at 2 days before the overlap. In some embodiments, the notification predetermined interval(s) is/are fixed (system-wide) while in some embodiments, the notification predetermined interval(s) is/are on a per-member basis and mechanisms are provided for each member to change/set their individual notification predetermined interval(s).

Since it is anticipated that this same schedule datum is to be downloaded multiple times, it is desired to suppress future notifications so that Tina and/or Mike, for example, do not receive notification every time the schedule data is transferred. To this, mechanisms are optionally present to retain knowledge of prior notifications or prior downloads. In such, if the same notification as a prior notification is detected or if the same download record as a prior download record is detected, notification is suppressed.

As with FIG. 1, this arrangement also optionally supports event codes as described above.

Figure 2:
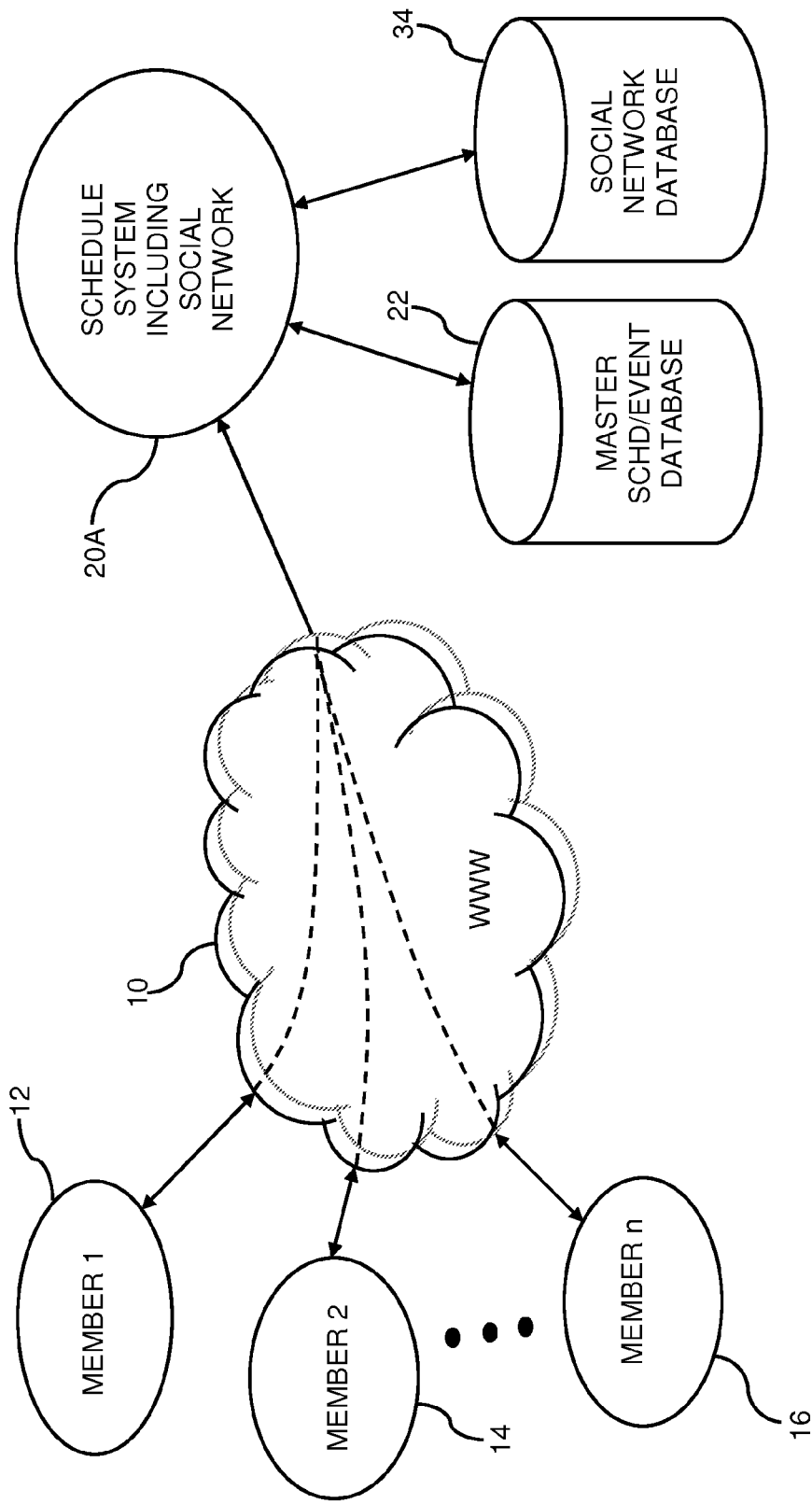
FIG. 2 illustrates a third exemplary schematic view of the system for travelers with layovers.

Referring to FIG. 2, another schematic view of the system for travelers with layovers is shown. In this embodiment, the schedule system 20A is part and the same as the social network. In such, the schedule system 20A provides the features of a social network, at least those that provide notification of member layover overlap. For simplicity, the following examples will use an airline personnel schedule system that assigns pilots and flight attendants to specific flight schedules, although it is anticipated that any system with scheduling capability is a possible user of the present invention. The schedule system 20A has access to a master schedule database 22 where the scheduling data is stored. The social network 20A extracts the data needed to perform layover matching and notifies the members 12/14/16 as will be described. As with many social network systems, the social network 20A has its own social network database 34 for storing security information, member information, etc. In this embodiment, several members 12/14/16 are connected to the social network 20A through the network 10. As an example, the members are pilots, flight attendants or truckers.

As with FIG. 1, this arrangement also optionally supports event codes as described above.

Figure 3:
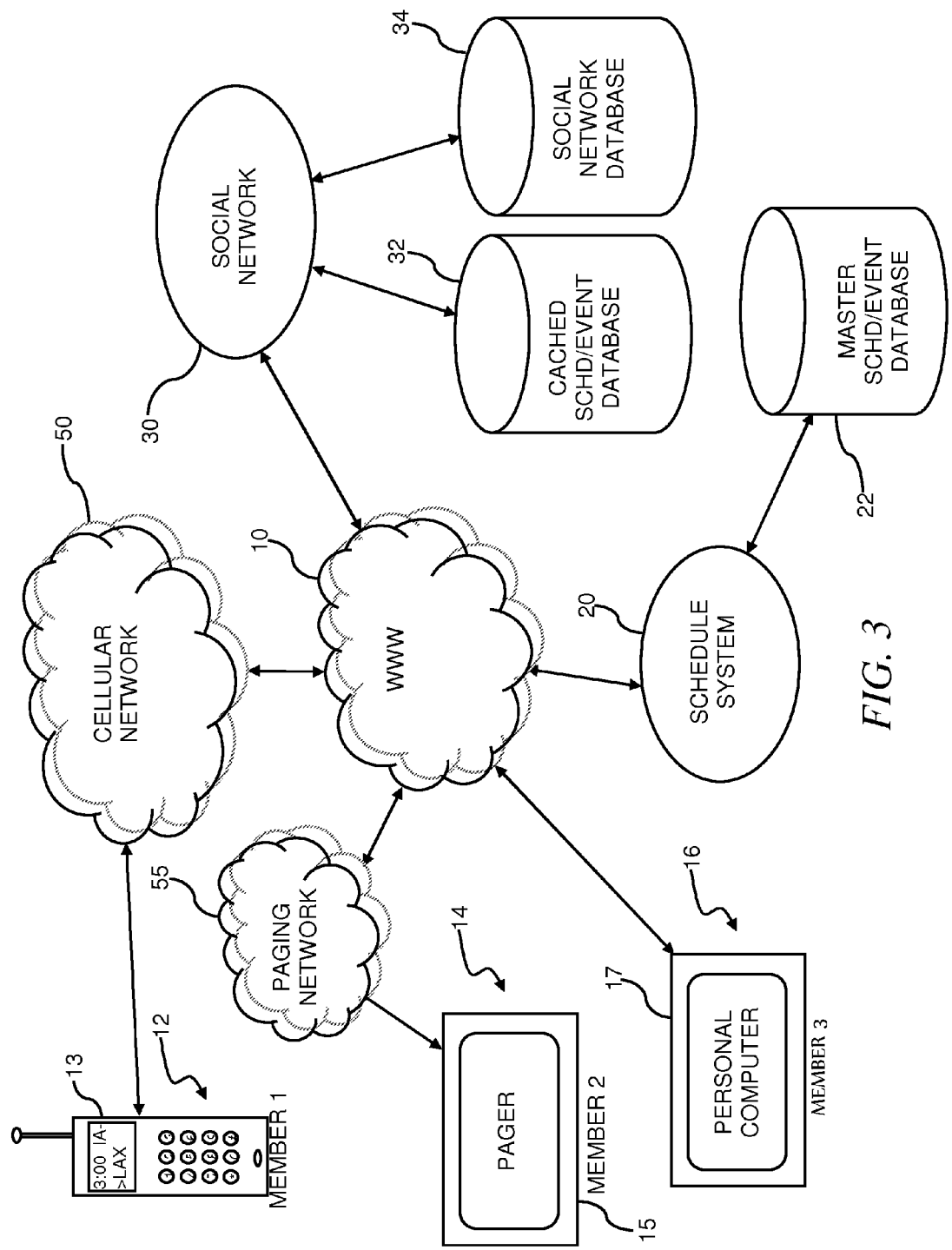
FIG. 3 illustrates a fourth exemplary schematic view of the system of system for travelers with layovers.

Referring to FIG. 3, another schematic view of the system for travelers with layovers is shown. In this, a schedule system 20 is external to the social network 30. A schedule system 20 is, for example, an airline personnel schedule system that assigns pilots and flight attendants to specific flight schedules. The schedule system 20 has access to a master schedule database 22 where the scheduling data is stored. In this embodiment, part or all of the schedule data from the master schedule database 22 is uploaded to the social network 30 through a network such as the Internet (WWW) 10. The social network 30 extracts the data needed to perform layover matching and stores at least that data in a cached schedule database 32. In some embodiment, the uploaded schedule data is processed as it is received and not stored in the cached schedule database 32. As overlapping layovers are detected for members and their buddies, the member and buddy are notified of the overlapping layover. As with many social network systems, the social network 30 has its own social network database 34 for storing security information, member information, etc. In this embodiment, several members 12/14/16 are directly or indirectly connected to the social network 30 through the network 10. The first user is connected through the cellular network 50 and notified either by a voice message or text message sent from the social network 30, through the Internet 10 and through the cellular network 50 to a cellular phone 13 used by the first member 12. The second user 14 is connected through the paging network 55 and notified by a alpha or numeric page message sent from the social network 30, through the Internet 10 and through the paging network 55 to a pager 15 used by the second member 14. The third user 16 is connected through the Internet 10 and notified by an email message sent from the social network 30 through the Internet 10 to a personal computer 17 used by the third member 16.

As with FIG. 1, this arrangement also optionally supports event codes as described above.

Figure 3A:
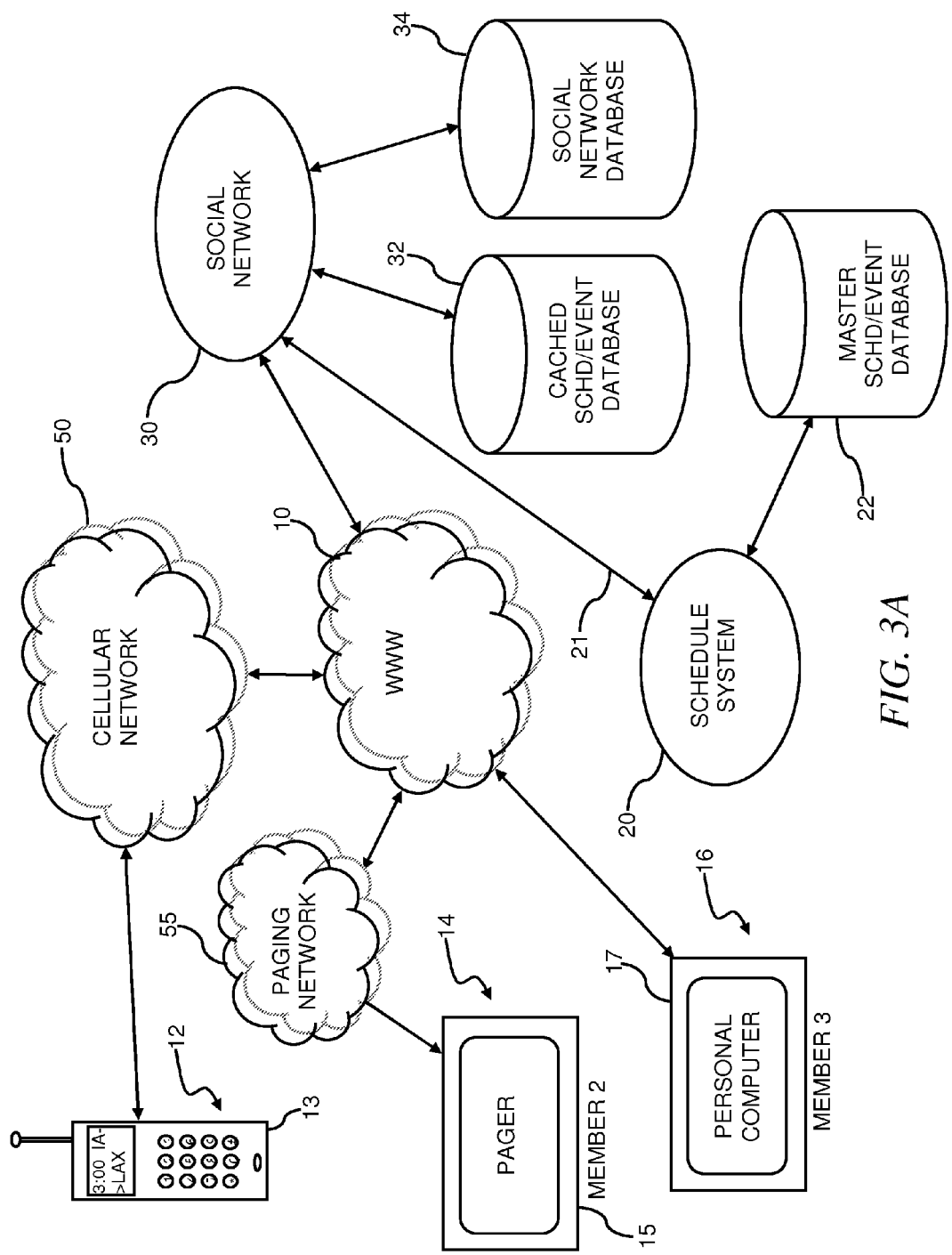
FIG. 3A illustrates a fifth exemplary schematic view of the system for travelers with layovers.

Referring to FIG. 3A, another schematic view of the system for travelers with layovers is shown. In this, a schedule system 20 is external to the social network 30. A schedule system 20 is, for example, an airline personnel schedule system that assigns pilots and flight attendants to specific flight schedules. The schedule system 20 has access to a master schedule database 22 where the scheduling data is stored. In this embodiment, part or all of the schedule data from the master schedule database 22 is uploaded to the social network 30 through a private connection 21, for example, a private line such as T1-carrier, T3-carrier, etc. The social network 30 extracts the data needed to perform layover matching and stores at least that data in a cached schedule database 32. In some embodiment, the uploaded schedule data is processed as it is received and not stored in the cached schedule database 32. As overlapping layovers are detected for members and their buddies, the member and buddy are notified of the overlapping layover. As with many social network systems, the social network 30 has its own social network database 34 for storing security information, member information, etc. In this embodiment, several members 12/14/16 are directly or indirectly connected to the social network 30 through the network 10. The first user is connected through the cellular network 50 and notified either by a voice message or text message sent from the social network 30, through the Internet 10 and through the cellular network 50 to a cellular phone 13 used by the first member 12. The second user 14 is connected through the paging network 55 and notified by a alpha or numeric page message sent from the social network 30, through the Internet 10 and through the paging network 55 to a pager 15 used by the second member 14. The third user 16 is connected through the Internet 10 and notified by an email message sent from the social network 30 through the Internet 10 to a personal computer 17 used by the third member 16.

As with FIG. 1, this arrangement also optionally supports event codes as described above.

Figure 4:
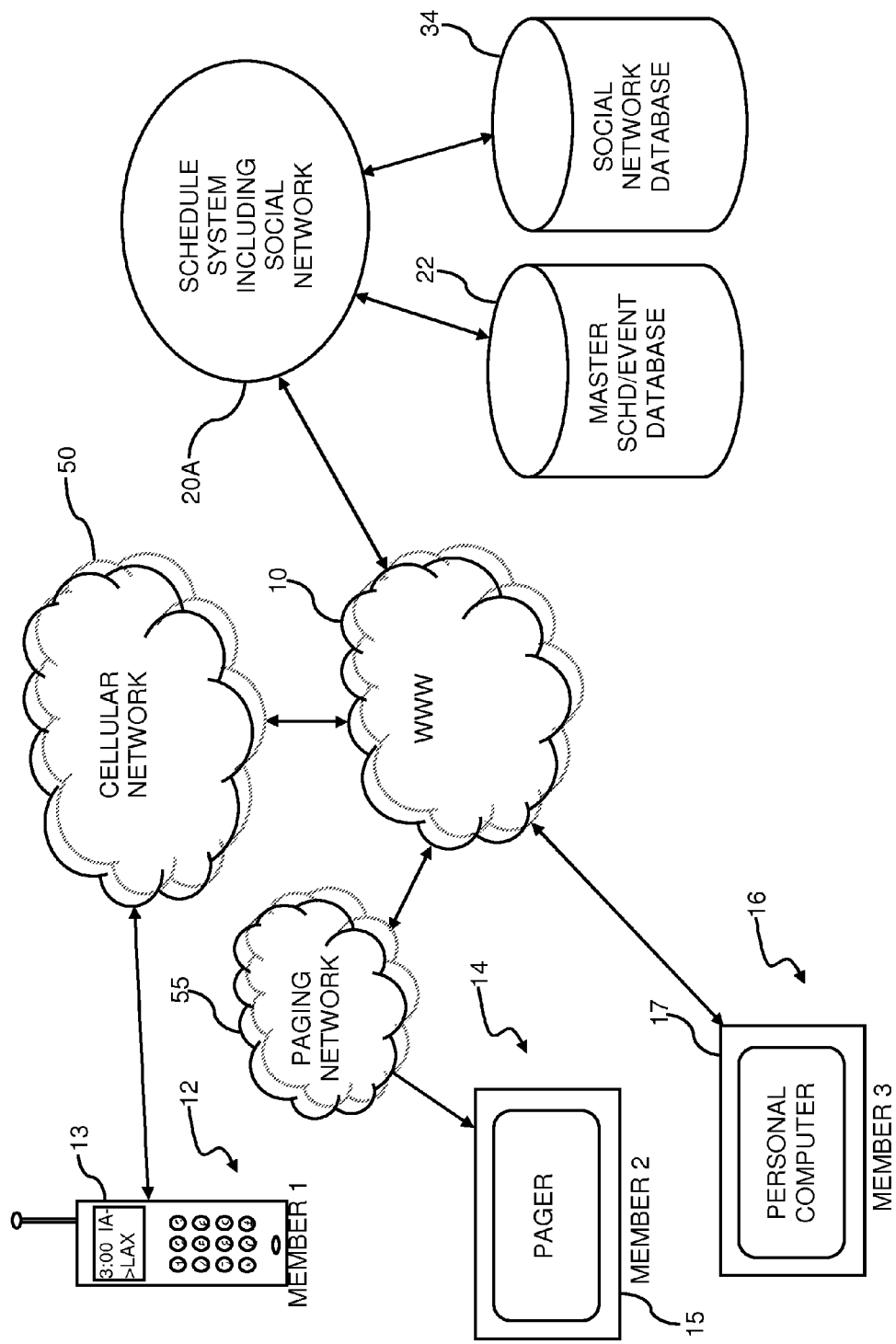
FIG. 4 illustrates a sixth exemplary schematic view of the system for travelers with layovers.

Referring to FIG. 4, another schematic view of the system for travelers with layovers is shown. In this, a combined schedule system and social network 20A is described. For example, the social network part 30 is integrated into the same server system as the scheduling system 20. A schedule system 20 is, for example, an airline personnel schedule system that assigns pilots and flight attendants to specific flight schedules. The combined schedule system and social network 20A has access to a master schedule database 22 where the scheduling data is stored. The combined schedule system and social network 20A extracts the data from the master schedule 22 needed to perform layover matching and stores at least that data in a cached schedule database 32. In some embodiment, the schedule data 22 is processed and not stored in the cached schedule database 32. As overlapping layovers are detected for members and their buddies, the member and buddy are notified of the overlapping layover. As with many social network systems, the combined schedule system and social network 20A has its own social network database 34 for storing security information, member information, etc. In this embodiment, several members 12/14/16 are directly or indirectly connected to the combined schedule system and social network 20A through the network 10. The first user is connected through the cellular network 50 and notified either by a voice message or text message sent from the combined schedule system and social network 20A, through the internet 10 and through the cellular network 50 to a cellular phone 13 used by the first member 12. The second user 14 is connected through the paging network 55 and notified by a alpha or numeric page message sent from the combined schedule system and social network 20A, through the Internet 10 and through the paging network 55 to a pager 15 used by the second member 14. The third user 16 is connected through the Internet 10 and notified by an email message sent from the combined schedule system and social network 20A through the Internet 10 to a personal computer 17 used by the third member 16.

As with FIG. 1, this arrangement also optionally supports event codes as described above.

Figure 5:
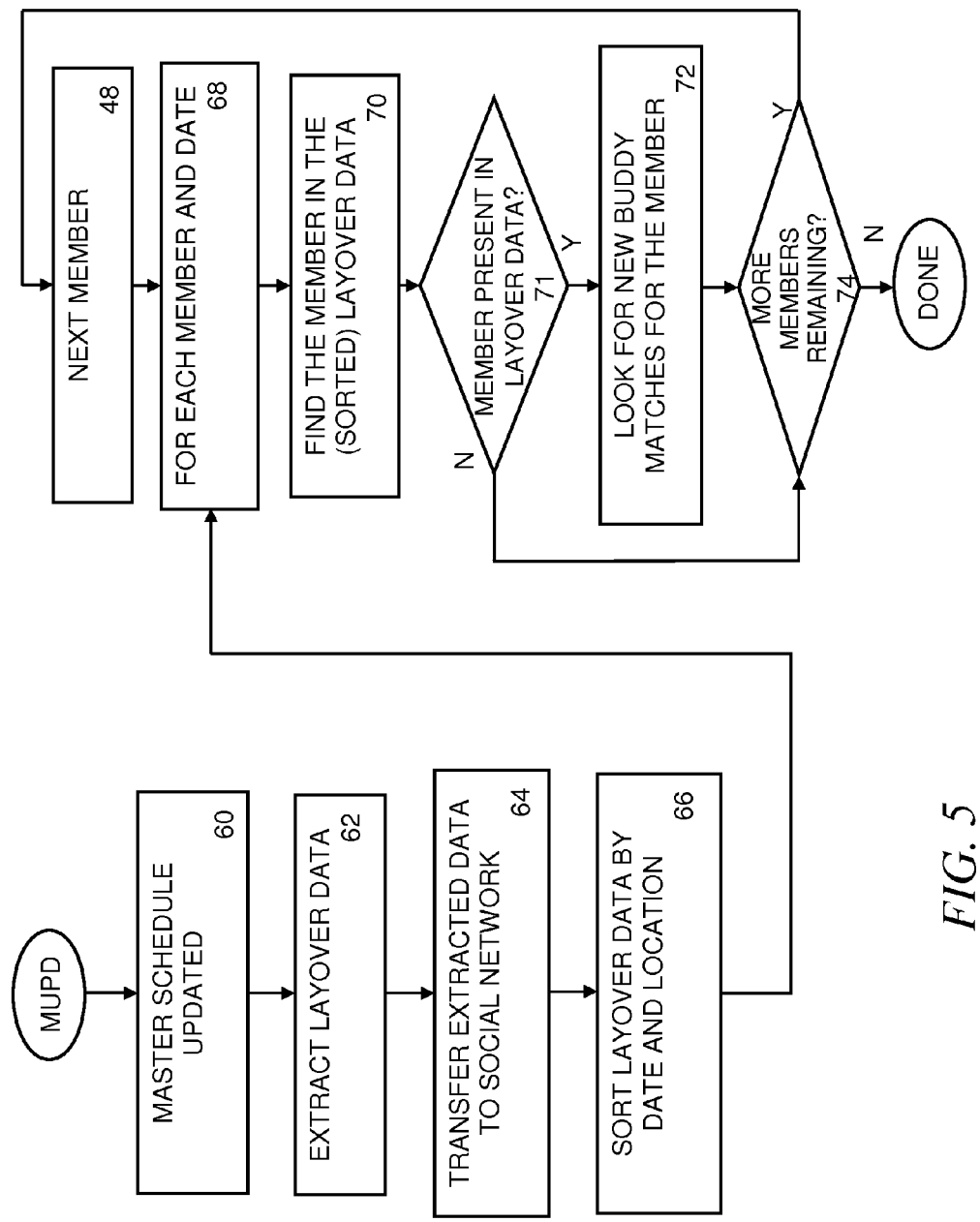
FIG. 5 illustrates a first exemplary flow chart of the system for travelers with layovers.

Referring to FIG. 5, an exemplary flow chart of the system for travelers with layovers is shown. In some embodiments, the system for travelers with layovers is initiated by one or more changes (e.g., a batch change) to the dataset (master schedule). In other embodiments, the dataset (master schedule) is scanned periodically, for example, at 3:00 AM (described in FIG. 5A). In this embodiment, the master schedule is updated 60 and then the layover data is extracted 62. For example, the master schedule has details regarding the aircraft type, gate number, etc., which is not needed by the social network 30 and such data is optionally stripped out when the layover data is extracted 62.

In embodiments where the schedule system 20 is distinct from the social network 30, the extracted layover data is transferred 64 from the schedule system 20 to the social network 30 either over the Internet 10 or by direct connection 21. In some embodiments, the layover data is optionally sorted 66 to improve performance. Next, for each known member (from the social network database 34) and date 68, the layover data is searched to find that member/date pair 70. For each member and date pair found in the layover data 71, the layover data is searched for buddy matches for that member 72. This is repeated until there are no more active members 74 with the next member 48. There are many other ways known to those skilled in the art to match up such members and layovers and the present invention is not limited to any one method, including the method described.

Figure 5A:
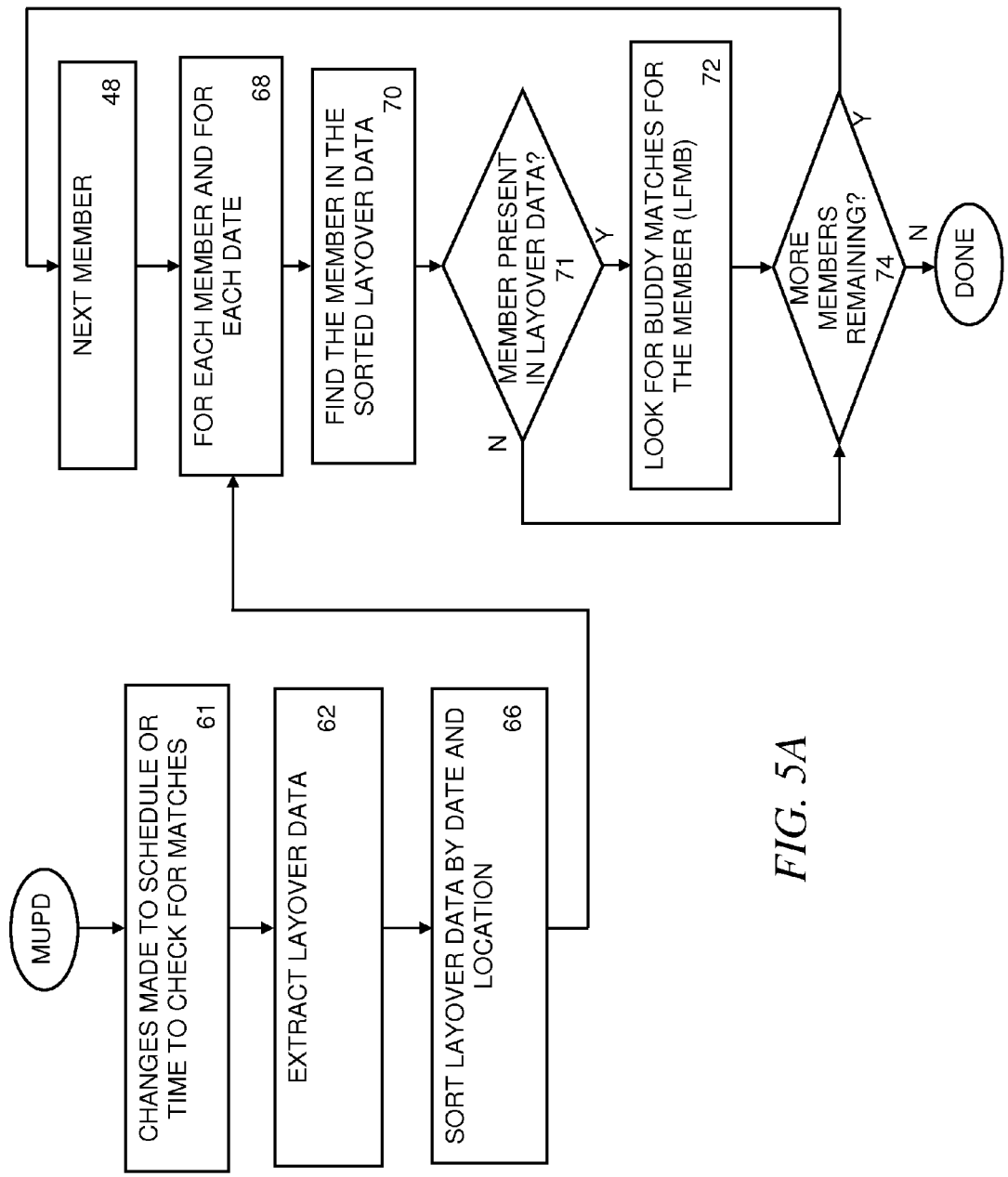
FIG. 5A illustrates a second exemplary flow chart of the system for travelers with layovers.

Referring to FIG. 5A, a second exemplary flow chart of the system for travelers with layovers is shown. In this embodiment, the methods of the system for travelers with layovers are initiated by one or more changes 61 (e.g., a batch change) to the dataset (master schedule) or at a specific time 61 (e.g., 2:30 AM). The method starts by extracting layover data 62. In embodiments where the schedule system 20 is distinct from the social network 30, the extracted layover data is transferred from the schedule system 20 to the social network 30 either over the Internet 10 or by direct connection 21. In some embodiments, the layover data is sorted 66 to improve performance. Next, for each known member (from the social network database 34) and date 68, the layover data is searched to find that member/date pair 70. For each member and date pair found in the layover data 71, the layover data is searched for buddy matches for that member 72. This is repeated until there are no more active members 74 in the social network database 34 using the next member 48. There are many other ways known to those skilled in the art to match up such members and layovers and the present invention is not limited to any one method, including the method described.

Figure 6:
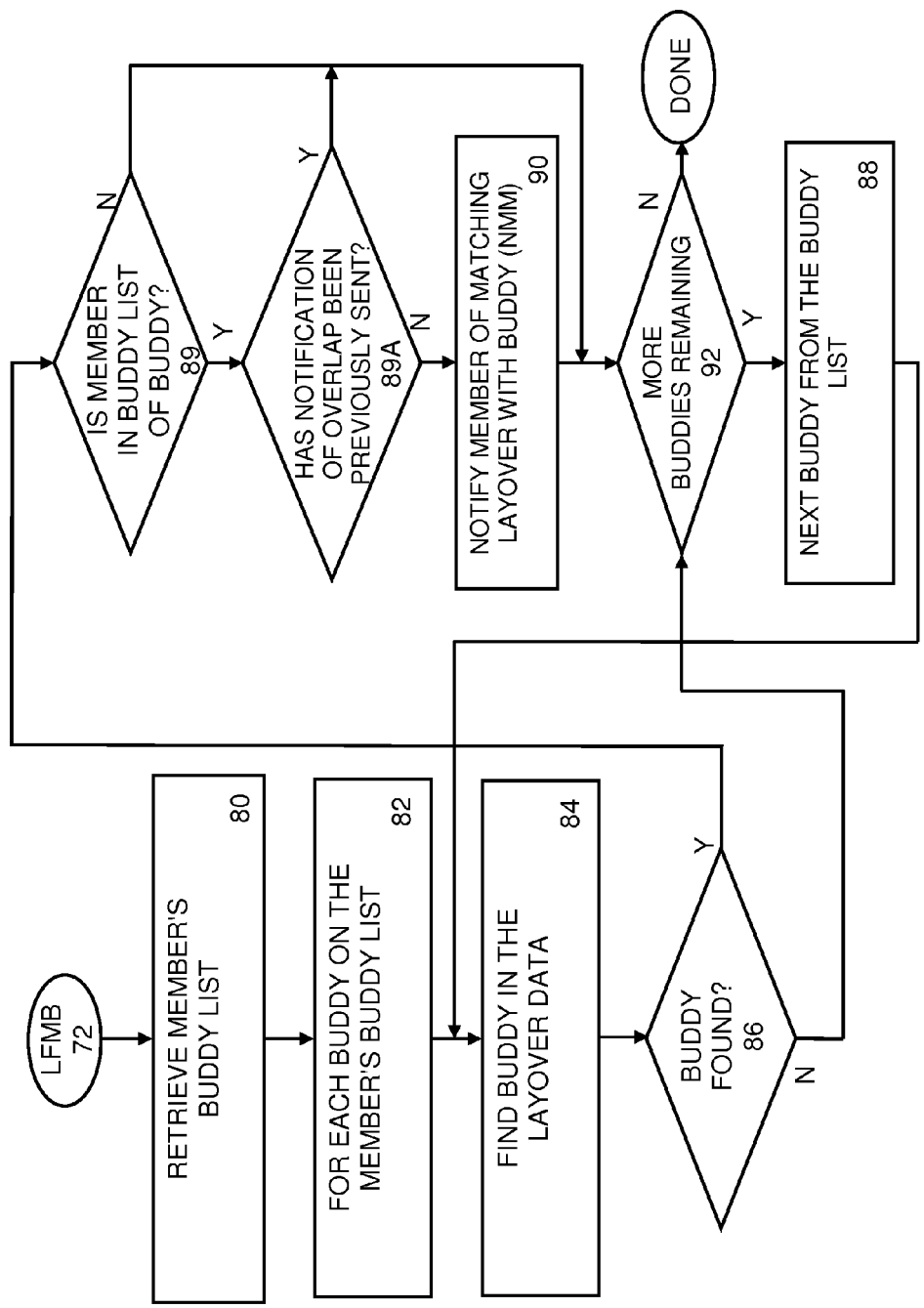
FIG. 6 illustrates a third exemplary flow chart of the system for travelers with layovers.

Referring to FIG. 6, a third exemplary flow chart 72 of finding matches for member's buddies in the system for travelers with layovers is shown. This part of the method operates when a member is found in the layover data (see FIGS. 5 and 5A). The member's buddy list is retrieved 80 (from the social network database 34). For each buddy on the list 82, the layover data is searched for the buddy 84. If the buddy is not found in the layover data 86 (having the same layover place and date as the member), if no more buddies exist 92, the flow is complete. Otherwise, the next buddy is retrieved from the list 88 and if there are more buddies on the list 92, the method continues. If the buddy is found in the layover data 86, a test is performed to determine if the member is a buddy (e.g., the member is on the buddy's buddy list) 89. This is one way to determine if the buddy allows the member to access the buddy's schedule data. There are other ways known to provide such permission, including but not limited to, the buddy allowing all members access, etc. If the member is allowed to access the buddy's schedule (e.g., on the buddy list of the buddy 89), optionally, a test 89A is performed to determine if this same notification has been already been made. There are many ways to determine if a notification has already been made, for example, recording each notification in a database/list and consulting that database/list to determine if a notification matches a previous notification record. If no prior notification was made 89A, the member is notified of a matching layover 90 (see FIG. 7) and if there are more buddies on the list 92, the method continues. If more buddies remain 92, the next buddy from the buddy list is accessed 88 and the method continues. If there are no more buddies on the list 92, the method is done.

Figure 6A:
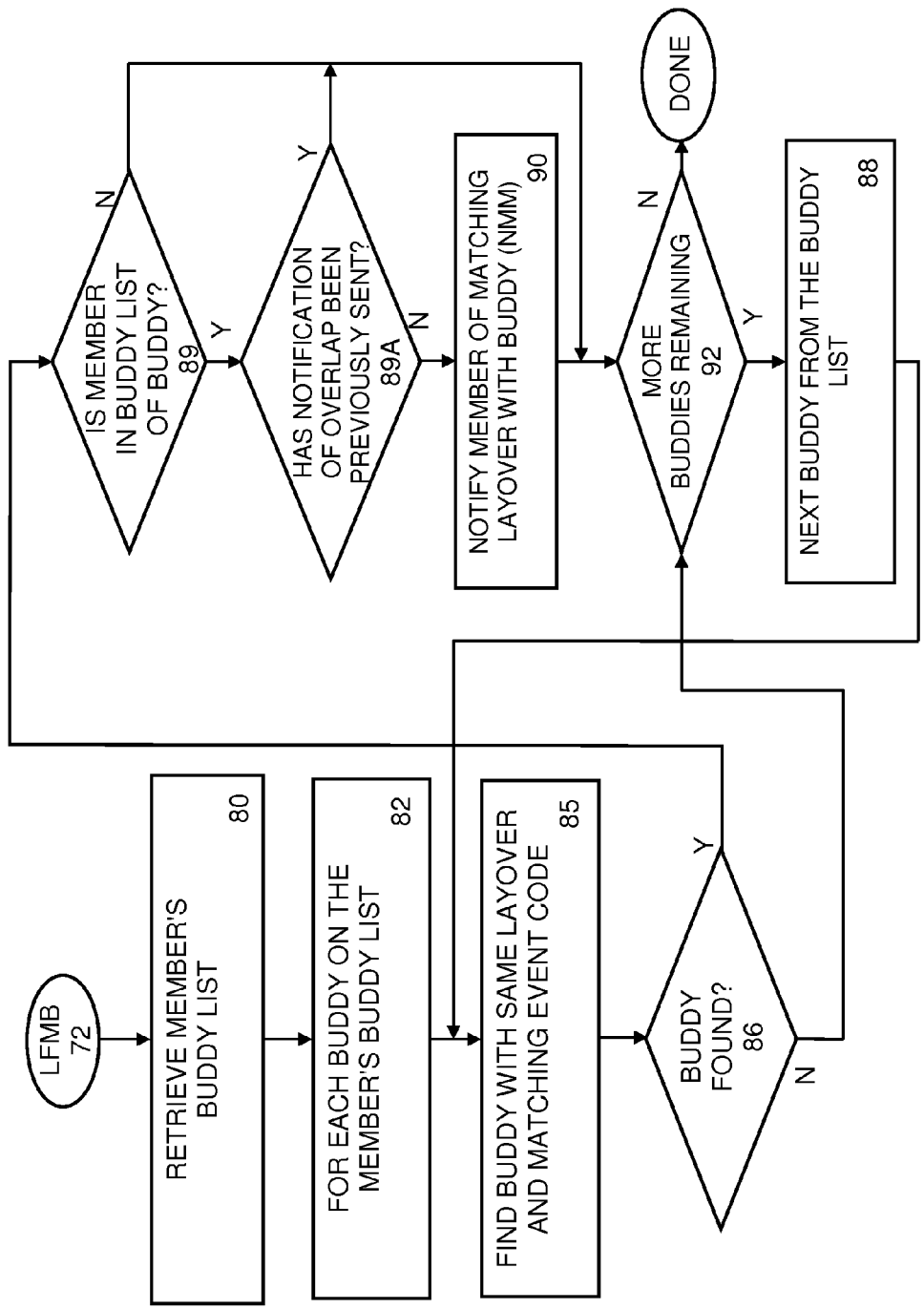
FIG. 6A illustrates a fourth exemplary flow chart of the system for travelers with layovers.

Referring to FIG. 6A, a fourth exemplary flow chart 72 of finding matches for member's buddies in the system for travelers with layovers is shown. This part of the method operates when a member is found in the layover data (see FIGS. 5 and 5A). The member's buddy list is retrieved 80 (from the social network database 34). For each buddy on the list 82, the layover data is searched for the buddy 85 having the same layover and matching event code (e.g., both the member and buddy will be at the same location for an overlapping time period and will have a matching event code indicating, for example, both are attending the same event). If the buddy is not found in the layover data 86 (having the same layover place, date, and event code as the member), then, if no more buddies exist 92, the flow is complete. Otherwise, the next buddy is retrieved from the list 88, and if there are more buddies on the list 92, the method continues. If the buddy is found in the layover data 86, a test is performed to determine if the member is a buddy (e.g., the member is on the buddy's buddy list) 89. This is one way to determine if the buddy allows the member to access the buddy's schedule data. There are other ways known to provide such permission, including but not limited to, the buddy allowing all members access, etc. If the member is allowed to access the buddy's schedule (e.g., on the buddy list of the buddy 89), optionally, a test 89A is performed to determine if this same notification has been already been made. There are many ways to determine if a notification has already been made, for example, recording each notification in a database/list and consulting that database/list to determine if a notification matches a previous notification record. If no prior notification was made 89A, the member is notified of a matching layover 90 (see FIG. 7) and if there are more buddies on the list 92, the method continues. If more buddies remain 92, the next buddy from the buddy list is accessed 88 and the method continues. If there are no more buddies on the list 92, the method is done.

Figure 6B:
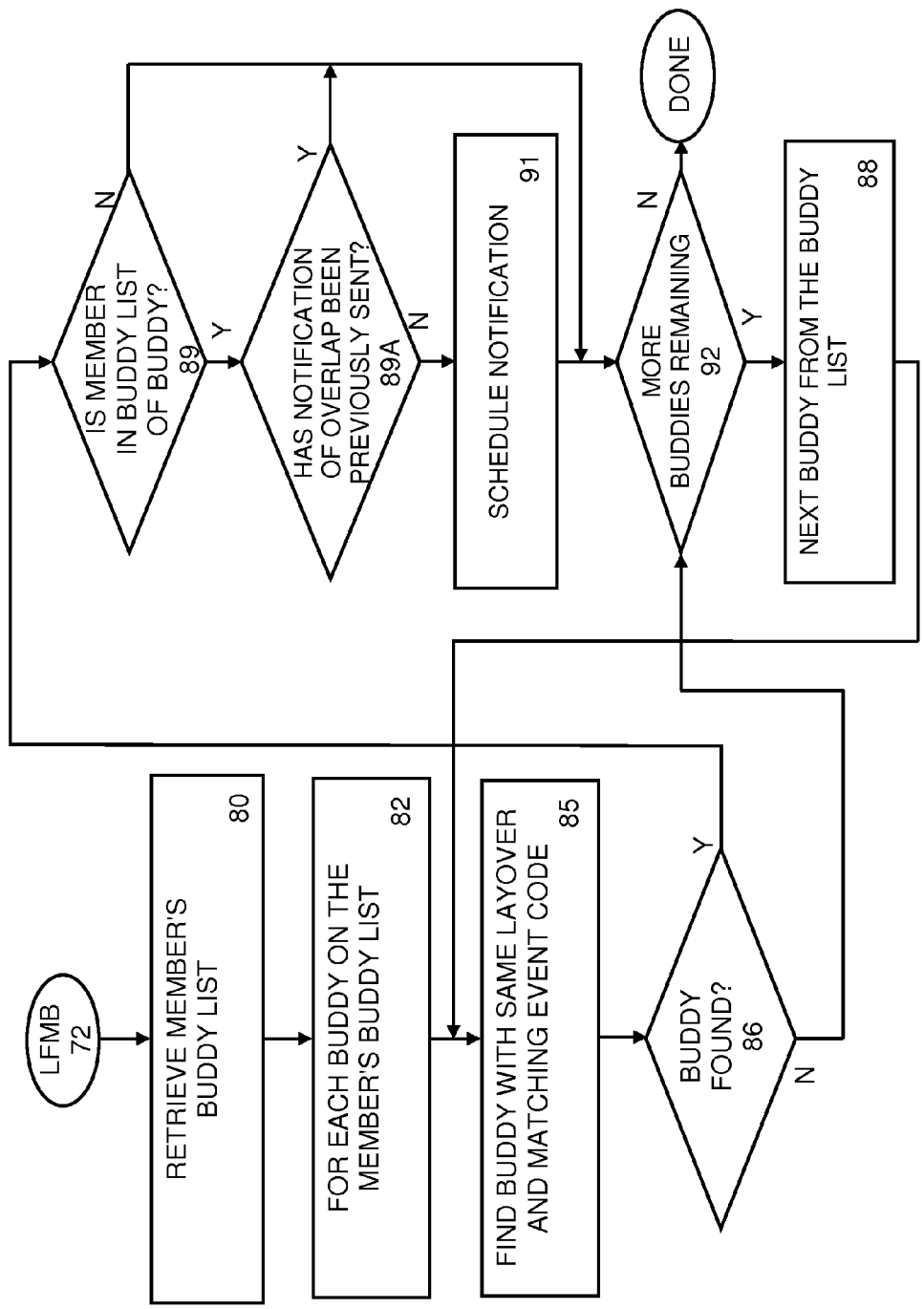
FIG. 6B illustrates a fifth exemplary flow chart of the system for travelers with layovers.

Referring to FIG. 6B, a fifth exemplary flow chart 72 of finding matches for member's buddies in the system for travelers with layovers is shown. This part of the method operates when a member is found in the layover data (see FIGS. 5 and 5A). The member's buddy list is retrieved 80 (from the social network database 34). For each buddy on the list 82, the layover data is searched for the buddy 85 having the same layover and matching event code (e.g., both the member and buddy will be at the same location for an overlapping time period and will have a matching event code indicating, for example, both are attending the same event). If the buddy is not found in the layover data 86 (having the same layover place, date, and event code as the member), then, if no more buddies exist 92, the flow is complete. Otherwise, the next buddy is retrieved from the list 88, and if there are more buddies on the list 92, the method continues. If the buddy is found in the layover data 86, a test is performed to determine if the member is a buddy (e.g., the member is on the buddy's buddy list) 89. This is one way to determine if the buddy allows the member to access the buddy's schedule data. There are other ways known to provide such permission, including but not limited to, the buddy allowing all members access, etc. If the member is allowed to access the buddy's schedule (e.g., on the buddy list of the buddy 89), optionally, a test 89A is performed to determine if this same notification has been already been made. There are many ways to determine if a notification has already been made, for example, recording each notification in a database/list and consulting that database/list to determine if a notification matches a previous notification record. If no prior notification was made 89A, a notification is scheduled 91 based upon a predetermined notification interval. For example, a global notification interval is set to 48 hours before the overlap or event or each member has an administrable notification interval and one member is notified five days before the overlap or event and another member is notified 24 hours before the overlap or event. Once the pre-determined notification interval occurs, notification is sent as in FIG. 7. Now, if there are more buddies on the list 92, the next buddy from the buddy list is accessed 88 and the method continues. If there are no more buddies on the list 92, the method is done.

Figure 7:
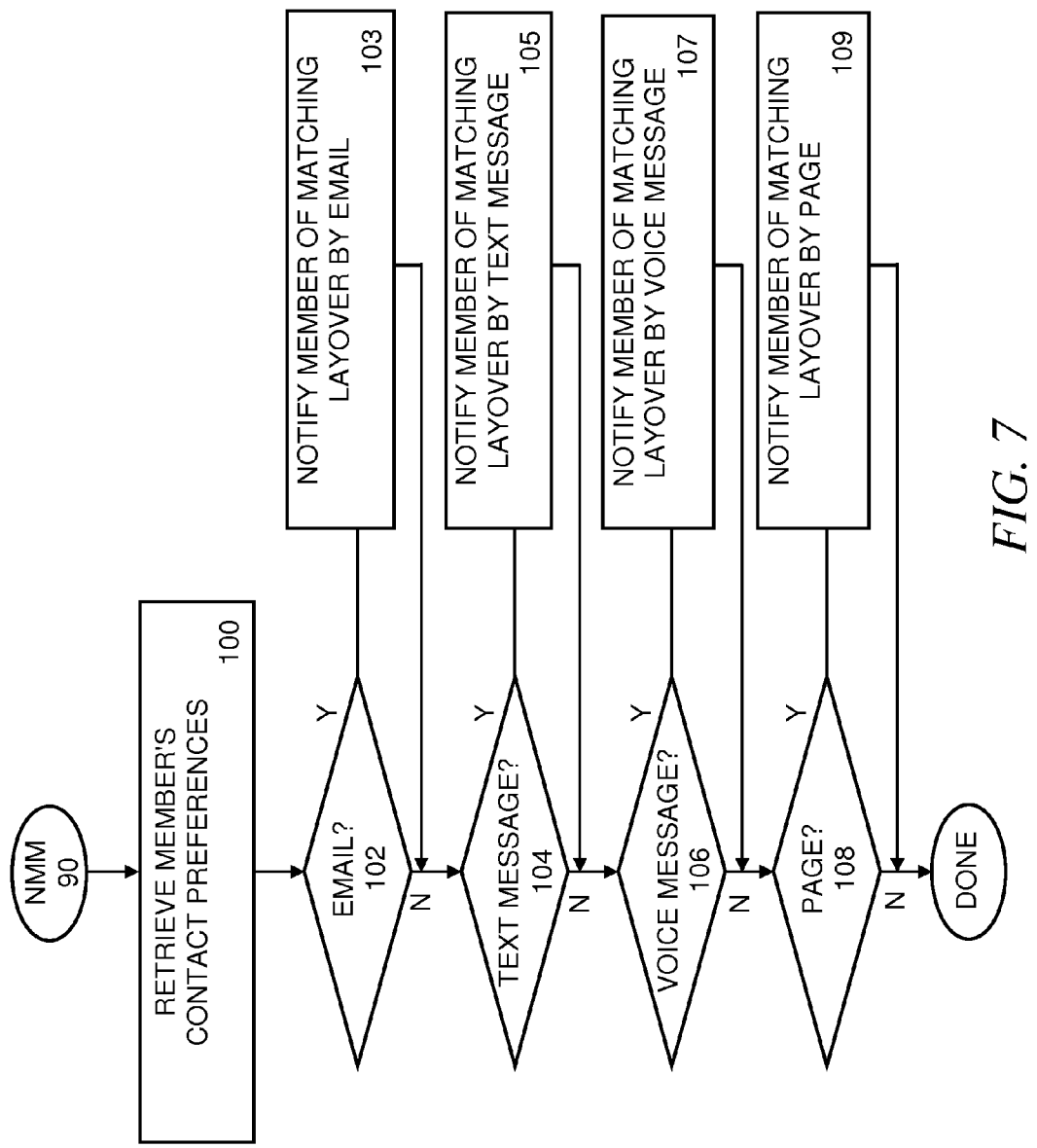
FIG. 7 illustrates a sixth exemplary flow chart of the system for travelers with layovers.

Referring to FIG. 7, a sixth exemplary flow chart 90 of a notification method of the system for travelers with layovers is shown. In this exemplary method of notifying a member of a matching overlay, the member's profile is consulted 100 to determine how the member is to be notified. It is assumed that the member has previously administered their profile with specifics regarding the method of notification as for example; see the discussion of FIG. 16. In this example, the data in the member's profile indicate whether the member desires email notification 102, text message notification 104, voice message notification 106 or a page notification 108. If the member desires email notification 102, the member is notified by an email message 103 sent from the social network 20/20A, through the Internet to the member's personal computer 17. If the member desires text message notification 104, the member is notified by a text message sent 105 from the social network 20/20A, optionally through the Internet and through the cellular network 50 to the member's cell phone 13. If the member desires voice message notification 106, the member is notified by a voice message sent 107 from the social network 20/20A, optionally through the Internet and through the cellular network 50 or plain old telephone network (not shown) to the member's phone or cell phone 13. In some embodiments, the voice message is pre-recorded while in other embodiments, the text message is created using text-to-speech or other methods known in the industry. If the member desires a page notification 108, the member is notified by a page sent 109 from the social network 20/20A, optionally through the Internet and through the paging network 55 to the member's pager 15.

Figure 8:
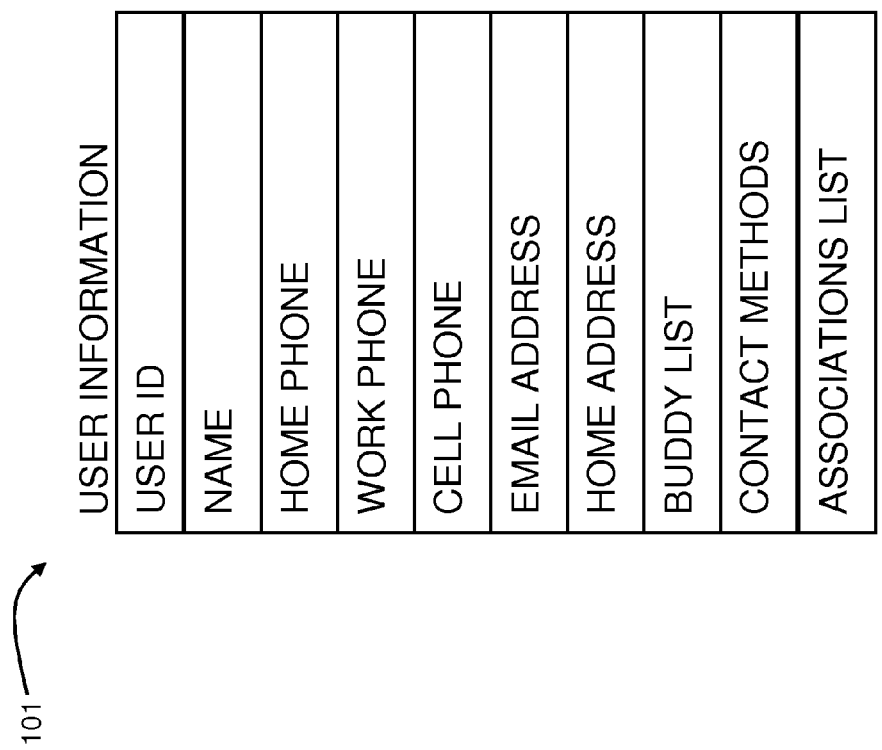
FIG. 8 illustrates an exemplary member data record of the system for travelers with layovers.

Referring to FIG. 8, a typical member data record 101 of the system for travelers with layovers is shown. Many possible data structures or databases are possible and known within the industry, all of which are included in the present invention. The member data record 101 is not limited to the fields shown. For example, in some embodiments, other fields are included such as work history so that a member will be able to search for other members who previously worked for the same company (e.g., the Air Force). The example shown in FIG. 8 includes a user id to assist in uniquely identifying the user, a member name, a home phone number, work phone number, cell phone number, email address, home address, buddy list and preferred contact methods (e.g., by text message . . . ). The buddy list is a list of other members that this member considers a "buddy" or friend, trusted in some way, etc.

Figure 9:
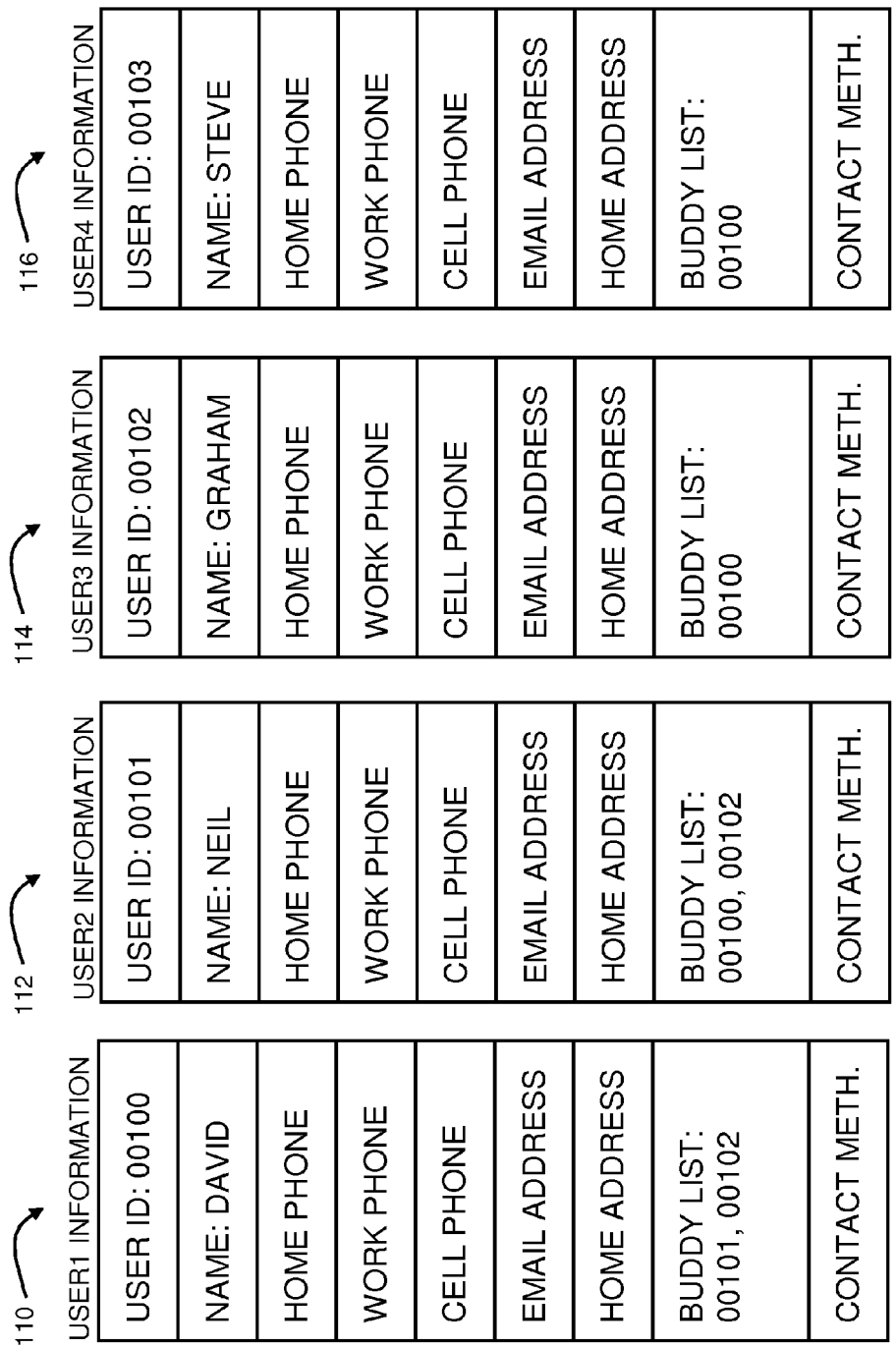
FIG. 9 illustrates an exemplary relationship example of several member data record of the system for travelers with layovers.

Referring to FIGS. 8 and 9, a relationship example of several member data record of the system for travelers with layovers is shown. In this very simple example, only four members are shown although in practice, hundreds or thousands of members are expected. Each member 110/112/114/116 has a user id (00100, 00101, 00102 and 00103 in this example), a name, phone numbers, email address, home address, contact method(s), a buddy list, and optionally, a list of associations. The optional associations list is a list of associations between each member and one or more schedule systems 20. For example, this list contains records or entries (unique person identifier) and each record includes an identifier of the schedule system 20 (e.g. United Airlines) and an identifier of the member (person identifier) within that schedule system 20 (e.g. badge number 123456), etc.

Figure 10:
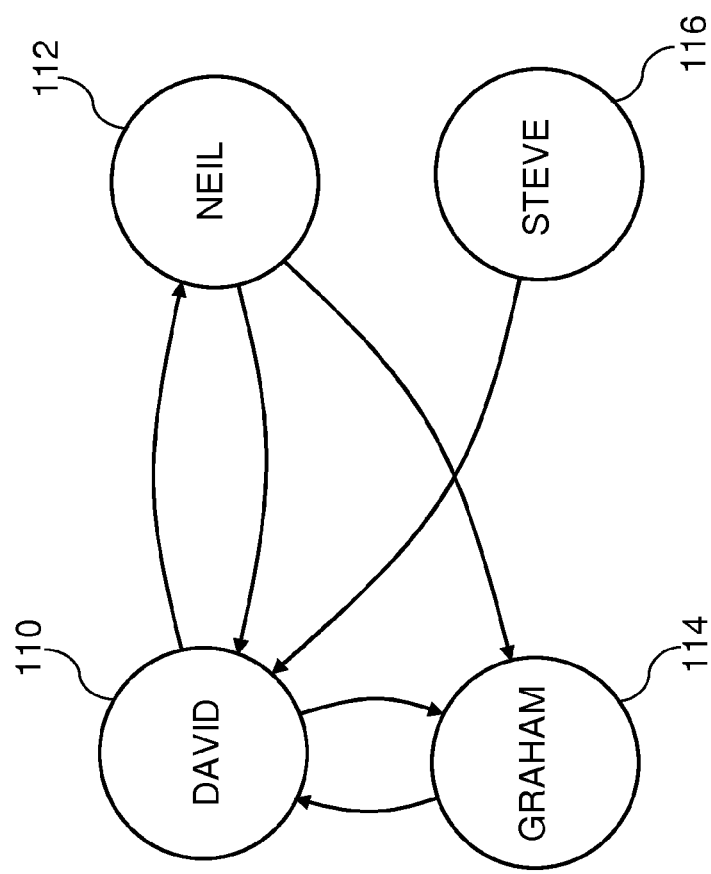
FIG. 10 illustrates a directed graph depicting the relationship between the several member data record in the example of FIG. 9 of the system for travelers with layovers.

For simplicity and program operation, the buddy list consists of a list of user ids of other members who are buddies with each other. For example, David's user information includes member 00101 and member 00102 in the buddy list, so Neil and Graham are buddies of David. Likewise, Neil includes user id 00100 in his buddy list and, therefore, David is a buddy of Neil and Neil is a buddy of David. These relationships are depicted in FIG. 10. David 110 is a buddy to everyone depicted by inwardly directed arrows (his user id is included in Neil's, Graham's and Steve's buddy list). Neil is a buddy of David. Graham is a buddy of David. Neil and Steve is not a buddy to each other. As will be shown in FIGS. 13 and 14, in the preferred embodiment, notification of an overlapping layover will be sent when a two-way relationship exists such as with David and Neil or with David and Graham. In such embodiments, no notification is provided when that two-way relationship is absent such as when an overlapping layover occurs between Neil and Steve.

In some embodiments, mechanisms are provided to make sure only one notification is sent to each member for a specific layover. For example, a match for David-Graham is a duplicate of a match for Graham-David. One method to prevent duplicate notifications is to save a record of the notification in a table/database and before sending a notification, consult that table/database to see if it was previously sent. For example, when David's notification is sent, the layover match will be recorded as 00100.00102.LAX.20070901 (low member user ID first) so that when the methods find Graham's buddy list and finds David as a match, it will not send another notification because the second match will also be tagged as 00100.00102.LAX.20070901 (low member user ID first).

Figure 10A:
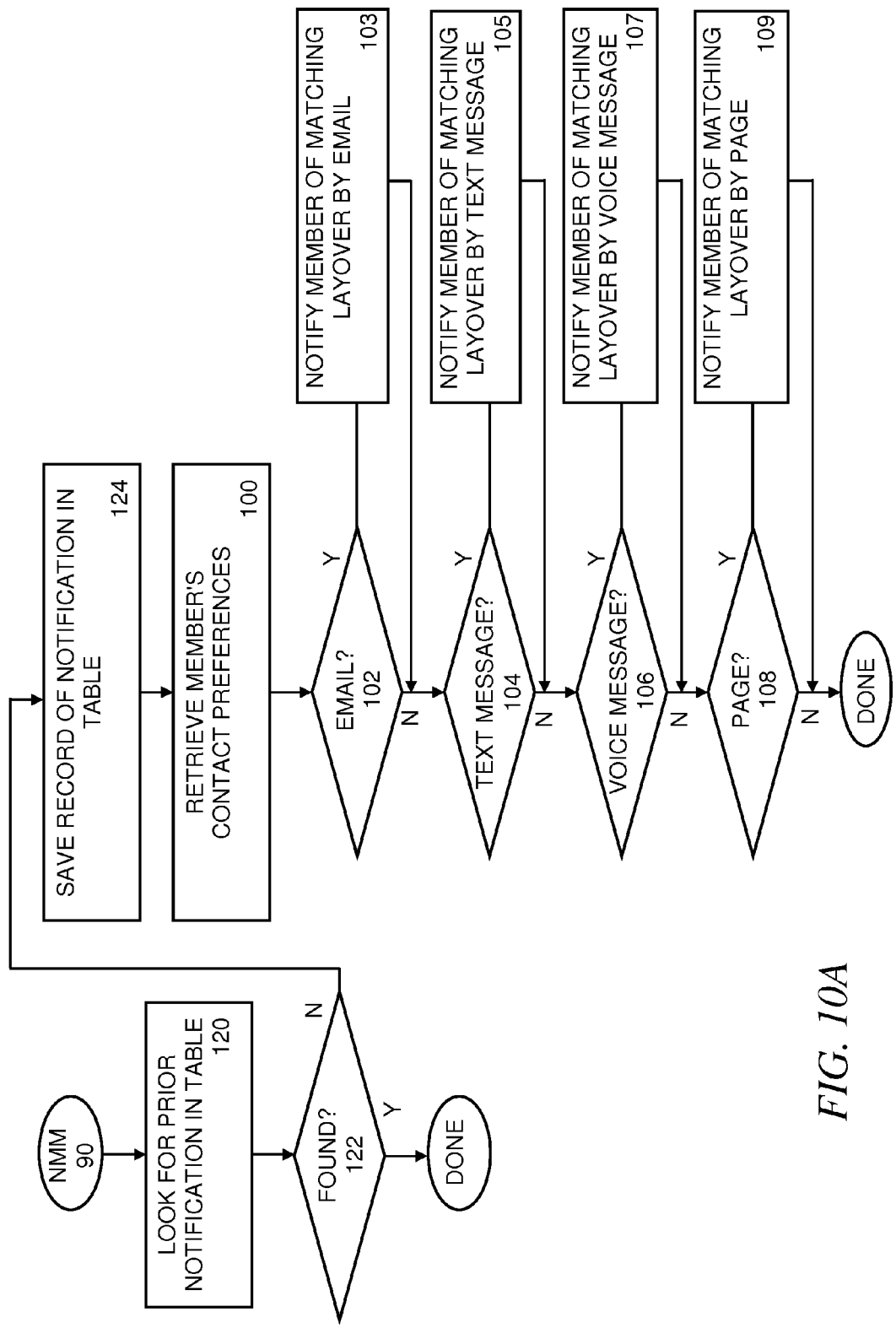
FIG. 10A illustrates a sixth exemplary flow chart for preventing duplicate notifications of the system for travelers with layovers.

Referring to FIG. 10A, an exemplary method of preventing duplicate notifications is shown. A table of prior notifications is searched 120 to determine if the current notification has already been found and sent. If the current notification is found in the table 122, nothing is done since the notification was previously sent. If it is not found 122, a record of the current notification is stored in the table 124 to prevent duplicate transmissions of the same notice. Now the method continues as in FIG. 7. The member's profile is consulted 100 to determine how the member is to be notified. It is assumed that the member has previously administered their profile with specifics regarding the method of notification as for example; see the discussion of FIG. 16. In this example, the data in the member's profile indicate whether the member desires email notification 102, text message notification 104, voice message notification 106 or a page notification 108. If the member desires email notification 102, the member is notified by an email message 103 sent from the social network 20/20A, through the Internet to the member's personal computer 17. If the member desires text message notification 104, the member is notified by a text message sent 105 from the social network 20/20A, optionally through the Internet and through the cellular network 50 to the member's cell phone 13. If the member desires voice message notification 106, the member is notified by a voice message sent 107 from the social network 20/20A, optionally through the Internet and through the cellular network 50 or plain old telephone network (not shown) to the member's phone or cell phone 13. In some embodiments, the voice message is pre-recorded while in other embodiments, the text message is created using text-to-speech or other methods known in the industry. If the member desires a page notification 108, the member is notified by a page sent 109 from the social network 20/20A, optionally through the Internet and through the paging network 55 to the member's pager 15.

In some embodiments, methods are provided to allow a member to blackout certain dates or date ranges so other members are not notified of overlapping layovers. For example, if David already has plans during his layover in Atlanta on July $2^{nd}$, David would create a blackout date for July $2^{nd}$ and the present invention would suppress sending a notification to either David or Graham regarding the July 2 layover. Alternately, the system would send a notification to David but not to Graham unless Graham also had a blackout set for July $2^{nd}$.

Because it is anticipated that repetitive records are downloaded from the schedule systems 20 to the social network 30, it is anticipated that in some embodiments, mechanisms are provided so that each notification will be made once (e.g. there is memory of prior notifications or prior schedule downloads) and that if a layover changes (e.g. a flight of a member is changed or canceled) then a new notification is made informing related members of the change.

Figure 11:
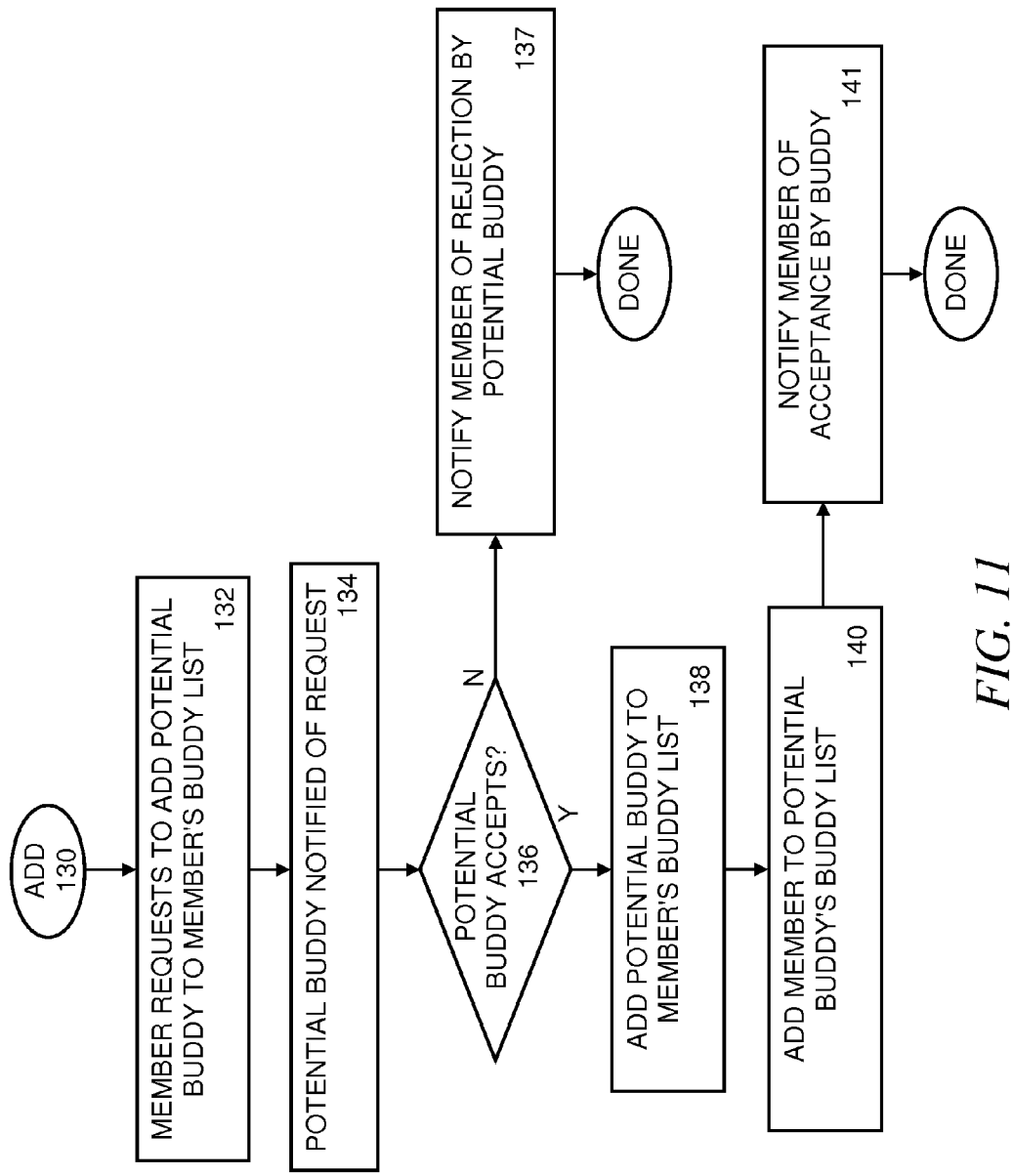
FIG. 11 illustrates a seventh exemplary flow chart for adding a member to a buddy list of the system for travelers with layovers.

Referring to FIG. 11, a flow chart for adding a member to a buddy list in the system for travelers with layovers is shown. For example, in the example of FIGS. 9 and 10, Steve is not on any other member's buddy list. In this exemplary method 130, the member (e.g., Steve) requests another member be added to his buddy list 132. The potential buddy (e.g., David) is notified that another member (e.g., Steve) wishes to become a member of their buddy list 134. This notification is normally sent by email, but in other embodiments, sent by page, text message, voice, etc. If the potential buddy (e.g., David) does not accept 136, to invitation remains open until the potential buddy either accepts or rejects at a later date. If the potential buddy outright rejects the request, the member (e.g., Steve) is notified of the rejection 137 by email or other known methods. If the potential buddy (e.g., David) accepts, the potential buddy (e.g., David) is added to the member's (e.g., Steve) buddy list 138 and the member (e.g., Steve) is added to the potential buddy's (e.g., David) buddy list as well 140 and the member (e.g., Steve) is notified of the acceptance 141 by email or other known methods.

Referring to FIG. 12, a table showing an exemplary schedule 150 of the system for travelers with layovers is shown. In this simplified example, for airline personnel 152 (David, Neil, Graham and Steve) are scheduled to fly on July $1^{st}$, July $2^{nd}$ and July $3^{rd}$ 154/156/158. For example, David flies from Tampa (TPA) at 7:00 AM on July $1^{st}$ to Memphis (MEM), arriving at 9:00 AM the same day, and then flies from Memphis (MEM) at 12:15 PM on July $1^{st}$ to San Francisco (SFO), arriving at 3:00 PM. Since no other flights are scheduled for David on July $1^{st}$, David has a layover in San Francisco on July $1^{st}$.

FIG. 13 shows a table of layovers of the exemplary schedule from FIG. 12. David and Neil have a layover in San Francisco on July $1^{st}$, David and Graham in Atlanta (ATL) on July $2^{nd}$ and Neil, Graham and Steve have a layover in Miami (MIA) on July $3^{rd}$. Prior to the present invention, it would be difficult for these people to discover that they were going to be staying overnight in the same geographic location (e.g., San Francisco Bay area) and could, perhaps, plan a social event such as dinner, etc. With the present invention, as soon as the master schedule 22 (or when a scan of the master schedule is performed, e.g., 3:00 AM), notifications are sent to members that have overlapping layovers with buddy members. Using the social network 20/20A database 34 examples from FIGS. 9 and 10, David and Neil would receive notification of their overlapping layover in San Francisco on July $1^{st}$, David and Graham would receive notice of their overlapping layover in Atlanta on July $2^{nd}$ but neither Neil, Graham nor Steve would receive notification because they don't have reciprocal buddy agreements (e.g., Steve is not on Neil's buddy list, Neil is not on Graham's buddy list and Steve is not on Graham's buddy list.

Referring to FIG. 14, a table showing an exemplary location translation and mapping table 170 is shown. Scheduling systems often indicate rather precise locations such as an airport location or a hotel location. The location translation and mapping table 170 such as shown in FIG. 14 provides mechanisms to map specific locations into an area or to determine a distance between two members when they have a layover. In such, multiple fine-grained (or exact) locations/destinations 172 are mapped to more general locations 174 or coordinates 175 are provided for distance calculation. As in the example shown, three airports (SFO, OAK and SJC) map to the San Francisco Bay area since they are all within a taxi, train or bus ride to each other.

In some embodiments, the coordinates 175 of the layovers are used to calculate a distance between the layovers. For example, if a first member has a layover, staying at the My Place Hotel in San Francisco from May 1 through May 7, and a second member (buddy of the first member) has a layover, staying at the Airport Hotel in San Jose from May 5 through May 10, a distance is determined between the two coordinates 175 (e.g. latitudes and longitudes) and if that distance is within a threshold (for example, 60 miles), then notification is provided. In this case, the distance is around 50 miles, so a notification would be provided but if one of the members was in Los Angeles instead, no notice is provided since the distance is over 50 miles. In some embodiments, each member has their own distance threshold and an administrative mechanism to change their distance threshold. In such, the first member, not wishing to travel great distances, sets their distance threshold to 10 miles, while the second member, perhaps having a car rental, sets their distance threshold to 100 miles. In such scenario given the prior layover scenario, the first member will not receive notice since the Airport Hotel in San Jose is further than 10 miles from the My Place Hotel in San Francisco while the second member will receive notice.

In some embodiments, the coordinates 175 are stored within the social network for travelers with layovers while on some embodiments, some or all of the coordinates 175 are found from a map service. For example, when a location unknown to the social network for travelers with layovers is provided, the social network for travelers with layovers performs a search for that location using an address, zip code, etc., the determine the coordinate 175 of that location. For example, if the member is driving to San Francisco and staying with their parents, the address or 10-digit zip code of the member's parents is used as one coordinate 175 in the distance calculation.

Figure 15:
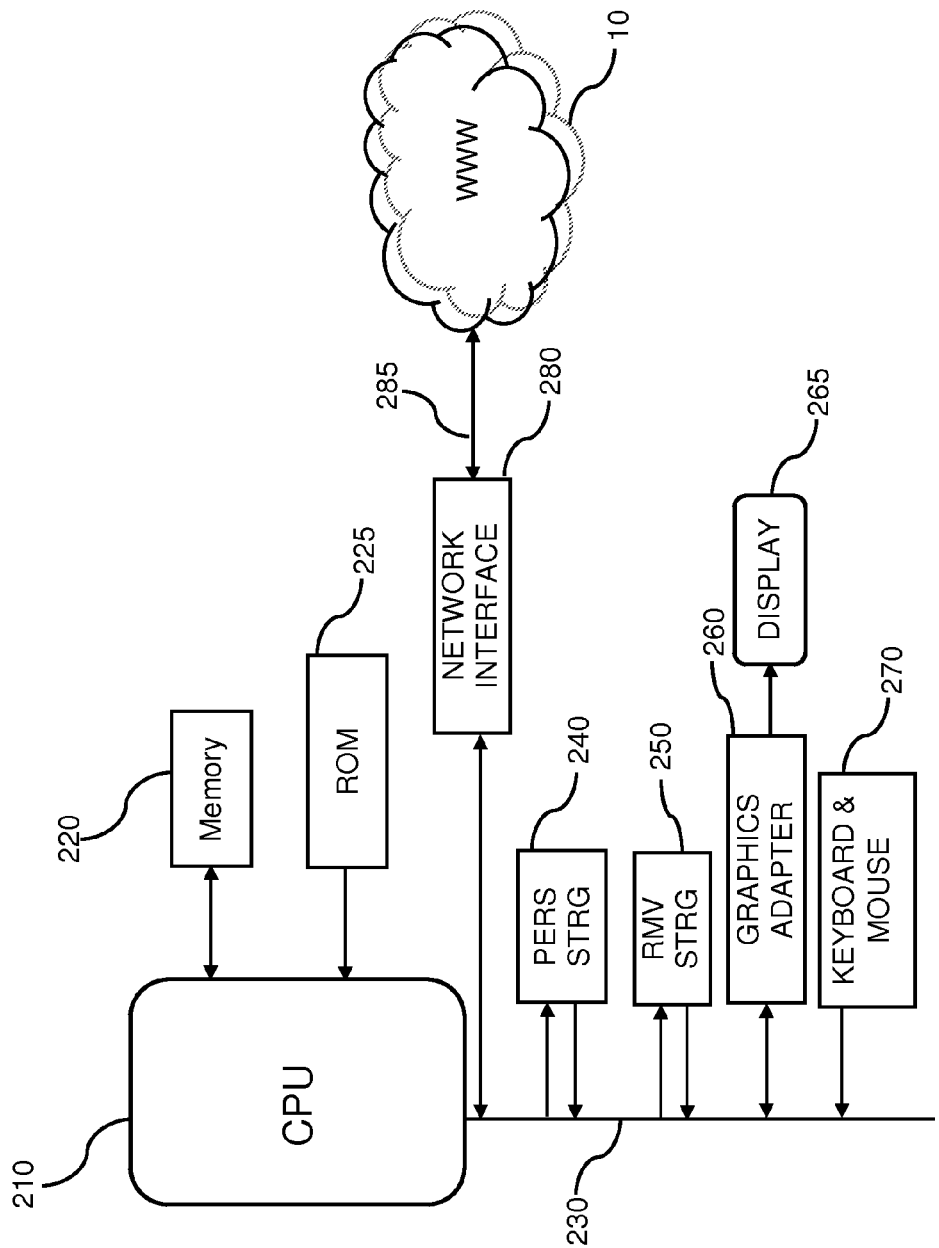
FIG. 15 illustrates a schematic diagram of a typical computer system used by the system for travelers with layovers.

Referring to FIG. 15, a schematic diagram of a computer system of the system for travelers with layovers is shown. Although shown in its simplest form, having a single processor, many different computer architectures are known that accomplish similar results in a similar fashion and the present invention is not limited in any way to any particular computer system. The present invention works well utilizing a single processor system as shown in FIG. 15, a multiple processor system where multiple processors share resources such as memory and storage, a multiple server system where several independent servers operate in parallel (perhaps having shared access to the data or any combination. In this, a processor 210 is provided to execute stored programs that are generally stored for execution within a memory 220. The processor 210 can be any processor or a group of processors, for example an Intel Pentium-4® CPU or the like. The memory 220 is connected to the processor and can be any memory suitable for connection with the selected processor 210, such as SRAM, DRAM, SDRAM, RDRAM, DDR, DDR-2, etc. Firmware is stored in firmware storage 225 that is connected to the processor 210 and may include initialization software known as BIOS. This initialization software usually operates when power is applied to the system or when the system is reset. In some embodiments, the software is read and executed directly from the firmware storage 225. Alternately, the initialization software is copied into the memory 220 and executed from the memory 220 to improve performance.

Also connected to the processor 210 is a system bus 230 for connecting to peripheral subsystems such as a network interface 280, a hard disk 240, a CDROM 250, a graphics adapter 260 and a keyboard/mouse 270. The graphics adapter 260 receives commands and display information from the system bus 230 and generates a display image that is displayed on the display 265.

In general, the hard disk 240 may be used to store programs, executable code and data persistently, while the CDROM 250 may be used to load said programs, executable code and data from removable media onto the hard disk 240. These peripherals are meant to be examples of input/output devices, persistent storage and removable media storage. Other examples of persistent storage include core memory, FRAM, flash memory, etc. Other examples of removable media storage include CDRW, DVD, DVD writeable, compact flash, other removable flash media, floppy disk, ZIP®, etc. In some embodiments, other devices are connected to the system through the system bus 230 or with other input-output connections. Examples of these devices include printers; graphics tablets; joysticks; and communications adapters such as modems and Ethernet adapters.

The network interface 280 connects the computer-based system to the world-wide-web 10 through a link 285 which is, preferably, a high speed link such as a cable broadband connection, a Digital Subscriber Loop (DSL) broadband connection, a T1 line or a T3 line.

Referring to FIG. 16, a typical user interface 300 for creating a member account in the system for travelers with layovers is shown. In this typical user interface 300, the new member enters their name (first and last), email address, confirmation of email address, password, confirmation of password, phone number, cell phone number, pager number and address. The same or similar user interface is presented when the member needs to change/update any of their personal information. In social network systems 30 in which an association mechanism is provided, the member adds as many associations as needed within the associations interface (e.g. United Airlines: 123456, Expedia: tina@yahoo,com, etc). The bottom of the user interface has four radio buttons 301 (circles that darken when selected) for the preferred method of contact (phone, cell, pager or email). The member selects one or more of these radio buttons 301, thereby a darkened circle indicates the member will receive notifications of overlapping layovers by the means associated with the darkened button. To restore the radio button 301 to its original non-selected state, it is selected again. Many user interface paradigms are known in the industry for obtaining user information and the example shown is just one possible user interface. All known user interfaces for obtaining user data and preferences are included in the present invention.

Referring to FIG. 17, a typical user interface 310 for inviting a member to be a buddy (friend) in the system for travelers with layovers is shown. In this sample email message from David, the recipient is invited to join the social network and become a member of David's buddy list. To do such, the recipient directs their browser to the cited web site 312, where they are presented with welcome user interface screens and registration user interfaces such as in FIG. 16.

Equivalent elements can be substituted for the ones set forth above such that they perform in substantially the same manner in substantially the same way for achieving substantially the same result.

It is believed that the system and method of the present invention and many of its attendant advantages will be understood by the foregoing description. It is also believed that it will be apparent that various changes may be made in the form, construction and arrangement of the components thereof without departing from the scope and spirit of the invention or without sacrificing all of its material advantages. The form herein before described being merely exemplary and explanatory embodiment thereof. It is the intention of the following claims to encompass and include such changes.

What is claimed is:

1. A computer system providing a social network for traveling people, the computer system comprising:
    a server computer;
    software executing on the server computer maintains a list of members and, for each member, the software maintains a list of buddies of the each member, the buddies also being in the list of members;
    the software downloads at least one schedule from one or more pre-determined schedule systems without user intervention, each schedule comprising a plurality of records, each of the records comprising a person identifier, at least one date/time, and at least one location, the person identifier identifies a person associated with the each record;
    the software searches each of the at least one schedule for a subset of the records in which the person identifier corresponds with the any member of the list of members and the software creates layover entries from the subset of the records, each of the layover entries comprise the member, a layover location, and a layover date/time;
    the software searches the layover entries for an overlapping layover, the overlapping layover determined by a first member of the list of members having a layover that overlaps with a layover of a buddy of the first member; and
    for each overlapping layover, the software, at a predetermined time, concurrently notifies both the first member and the buddy who have the overlapping layover.

2. The computer system of claim 1, wherein the predetermined time is now.

3. The computer system of claim 1, wherein the predetermined time is at a fixed interval before the overlapping layover.

4. The computer system of claim 3, wherein the interval is 48 hours.

5. The computer system of claim 3, wherein the interval is a parameter set by the first member.

6. The computer system of claim 3, wherein the interval is a parameter set by the buddy.

7. The computer system of claim 1, wherein each of the records further comprises a predetermined unique event code, the predetermined unique event code corresponding to exactly one event, the one event having a location for the one event and a time for the one event, and each of the layover entries further comprises the predetermined unique event code.

8. The computer system of claim 7, wherein the software determines if there is an overlapping layover by the first member of the list of members having a layover that overlaps with a layover of the buddy of the first member and if the predetermined unique event codes match.

9. A method of notifying members of a social network of upcoming overlapping layovers comprising:
    (a) maintaining a list of members and, for each member, maintaining a list of buddies of the each member;
    (b) downloading at least one schedule from at least one pre-determined schedule system without user intervention, each of the at least one schedule created by one of the at least one schedule system, each record of the at least one schedule comprising a person identifier, a date, and a location;
    (c) for each record, if the person identifier matches an identity of a member, saving a layover data record that includes the identity of the member, the date, and the location; and
    (d) for each of the layover data records, searching the layover data records for a buddy having an overlapping layover data record, and if the searching finds an overlapping layover data record, automatically and concurrently notifying the member and the buddy of the overlapping layover at a predetermined time.

10. The method of claim 9, wherein the predetermined time is now.

11. The method of claim 9, wherein the predetermined time is 48 hours before the date.

12. The method of claim 9, wherein the predetermined time is settable by each of the members of the list of members.

13. The method of claim 9, wherein each of the records further comprises a predetermined unique event code, the predetermined unique event code corresponding to exactly one event, the one event having a location for the one event and a time for the one event, and the step of saving further comprises saving the predetermined unique event code in the layover data.

14. The method of claim 13, wherein the step of searching determines if there is an overlapping layover and the predetermined unique event codes match.

15. Program instructions tangibly embodied in a non-transitory storage medium for notifying of upcoming overlapping layovers, wherein the at least one instruction comprises:
   (a) computer readable instructions maintain a list of members and, for each member, maintain a list of buddies of the each member, each member having at least one association to at least one unique identifier;
   (b) without user intervention, computer readable instructions download at least one schedule, each of the at least one schedule created on a pre-determined schedule system without direct input from the each member, each of the at least one schedules comprising a plurality of records, each of the records comprising a person identifier, at least one date, and at least one location;
   (c) computer readable instructions extract layover data from the records in which the person identifier in the record corresponds with the unique identifier of any member of the list of members, the layover data comprises the any member, a layover location, and a layover time period, wherein the person identifier assists in uniquely identifying a correspondence between the records in the schedules and the any member of the list of members;
   (d) computer readable instructions search the layover data for a set of overlapping layovers in which a layover of the member and a layover of a buddy of the member have the same location;
   (e) for each overlapping layover in the set of overlapping layovers, computer readable instructions concurrently notify the member and the buddy of the overlapping layover at a predetermined time; and
   (f) periodically repeating steps (b) and (e).

16. The program instructions tangibly embodied in the non-transitory storage medium of claim 15, wherein the predetermined time is now.

17. The program instructions tangibly embodied in the non-transitory storage medium of claim 15, wherein the predetermined time is 48 hours before the date.

18. The program instructions tangibly embodied in the non-transitory storage medium of claim 15, wherein the predetermined time is settable by each of the members of the list of members.

19. The program instructions tangibly embodied in the non-transitory storage medium of claim 15, wherein the computer readable instructions that download at least one schedule download the at least one schedule from an itinerary organizing system.

\* \* \* \* \*